(12) United States Patent
Inoue

(10) Patent No.: US 10,764,491 B2
(45) Date of Patent: Sep. 1, 2020

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Yuichi Inoue, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 11 days.

(21) Appl. No.: 16/010,871

(22) Filed: Jun. 18, 2018

(65) Prior Publication Data

US 2019/0007603 A1    Jan. 3, 2019

(30) Foreign Application Priority Data

Jun. 28, 2017 (JP) .................................. 2017-126767

(51) Int. Cl.
| | |
|---|---|
| H04N 5/232 | (2006.01) |
| G06K 7/10 | (2006.01) |
| G06K 9/00 | (2006.01) |
| G06K 9/46 | (2006.01) |
| H04N 7/18 | (2006.01) |

(52) U.S. Cl.
CPC ..... *H04N 5/23222* (2013.01); *G06K 7/10722* (2013.01); *G06K 9/00577* (2013.01); *G06K 9/4642* (2013.01); *H04N 7/18* (2013.01); *G06K 2009/0059* (2013.01)

(58) Field of Classification Search
CPC combination set(s) only.
See application file for complete search history.

(56) References Cited

U.S. PATENT DOCUMENTS

| | | | |
|---|---|---|---|
| 9,602,691 B2 | 3/2017 | Miyake et al. | |
| 2002/0002679 A1* | 1/2002 | Murakami | G06K 9/522 713/176 |
| 2003/0083098 A1* | 5/2003 | Yamazaki | G06T 1/0064 455/556.1 |
| 2016/0080603 A1 | 3/2016 | Miyake et al. | |
| 2016/0080648 A1* | 3/2016 | Iguchi | H04N 5/23238 348/222.1 |

FOREIGN PATENT DOCUMENTS

JP          201663263         4/2016

* cited by examiner

*Primary Examiner* — Leon Viet Q Nguyen
(74) *Attorney, Agent, or Firm* — Venable LLP

(57) ABSTRACT

An image processing apparatus includes an imaging unit configured to capture an image of a printed matter in which additional information has been embedded by an electronic watermark and an extraction unit configured to perform an extraction process of extracting the additional information from captured image information obtained by the imaging unit. The image processing apparatus further includes a notification unit configured to notify information indicating that the imaging unit is in a stage of preparation for the extraction process in a case where a positional relationship between the printed matter and the imaging unit satisfies some of conditions for starting the extraction process.

11 Claims, 18 Drawing Sheets

|   |   |   | -1 | -1 |
|---|---|---|----|----|
|   | -1 | -1 | 2 | 2 |
| -1 | 2 | 2 | -1 | -1 |
| 2 | -1 | -1 |   |   |
| -1 |   |   |   |   |

FIG.9A

|   |   | -1 | 2 | -1 |
|---|---|----|---|----|
|   |   | -1 | 2 | -1 |
|   | -1 | 2 | -1 |   |
|   | -1 | 2 | -1 |   |
| -1 | 2 | -1 |   |   |

FIG.9B

| 3 | 3 | 2 | 2 | 1 | 1 | 0 | 0 | 3 | 3 | 2 | 2 | 1 | 1 | 0 | 0 |
|---|---|---|---|---|---|---|---|---|---|---|---|---|---|---|---|
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |
| 3 | 3 | 2 | 2 | 1 | 1 | 0 | 0 | 3 | 3 | 2 | 2 | 1 | 1 | 0 | 0 |
| 2 | 2 | 1 | 1 | 0 | 0 | 3 | 3 | 2 | 2 | 1 | 1 | 0 | 0 | 3 | 3 |
| 1 | 1 | 0 | 0 | 3 | 3 | 2 | 2 | 1 | 1 | 0 | 0 | 3 | 3 | 2 | 2 |
| 0 | 0 | 3 | 3 | 2 | 2 | 1 | 1 | 0 | 0 | 3 | 3 | 2 | 2 | 1 | 1 |

FIG.12

| 3 | 2 | 1 | 0 | 3 | 2 | 1 | 0 | 3 | 2 | 1 | 0 | 3 | 2 | 1 | 0 |
|---|---|---|---|---|---|---|---|---|---|---|---|---|---|---|---|
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 2 | 1 | 0 | 3 | 2 | 1 | 0 | 3 | 2 | 1 | 0 | 3 | 2 | 1 | 0 | 3 |
| 1 | 0 | 3 | 2 | 1 | 0 | 3 | 2 | 1 | 0 | 3 | 2 | 1 | 0 | 3 | 2 |
| 1 | 0 | 3 | 2 | 1 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |
| 3 | 2 | 1 | 0 | 3 | 2 | 1 | 0 | 3 | 2 | 1 | 0 | 3 | 2 | 1 | 0 |
| 3 | 2 | 1 | 0 | 3 | 2 | 1 | 0 | 3 | 2 | 1 | 0 | 3 | 2 | 1 | 0 |
| 2 | 1 | 0 | 3 | 2 | 1 | 0 | 3 | 2 | 1 | 0 | 3 | 2 | 1 | 0 | 3 |
| 2 | 1 | 0 | 3 | 2 | 1 | 0 | 3 | 2 | 1 | 0 | 3 | 2 | 1 | 0 | 3 |
| 1 | 0 | 3 | 2 | 1 | 0 | 3 | 2 | 1 | 0 | 3 | 2 | 1 | 0 | 3 | 2 |
| 1 | 0 | 3 | 2 | 1 | 0 | 3 | 2 | 1 | 0 | 3 | 2 | 1 | 0 | 3 | 2 |
| 0 | 3 | 2 | 1 | 0 | 3 | 2 | 1 | 0 | 3 | 2 | 1 | 0 | 3 | 2 | 1 |
| 0 | 3 | 2 | 1 | 0 | 3 | 2 | 1 | 0 | 3 | 2 | 1 | 0 | 3 | 2 | 1 |

FIG.13

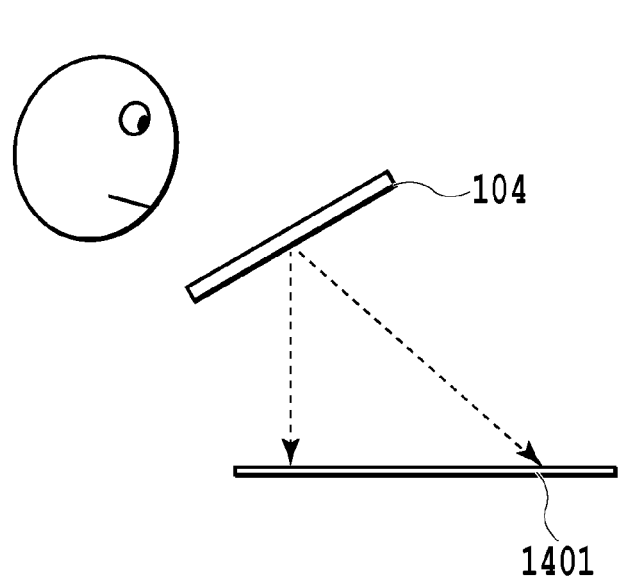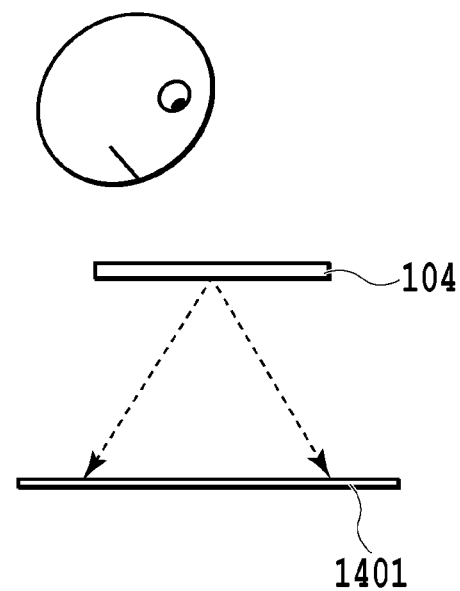
FIG.14A  FIG.14B

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium that extract additional information which is less likely to be visually recognized from image information in which the additional information has been embedded.

Description of the Related Art

In recent years, a technique has been used which is referred to as an electronic watermark technique and multiplexes and embeds additional information, such as an author name or information indicating whether use is permitted, in image information, such as a photograph or a painting, so as not to be visually recognized. As a method for reading the additional information embedded by the electronic watermark technique, there is a method which captures an image of a target using an imaging apparatus, such as a camera, analyzes obtained image information, and extracts additional information.

Japanese Patent Laid-Open No. 2016-63263 discloses a technique that can accurately read additional information embedded in a printed matter even in a case where hand shake occurs when the user takes a picture of the printed matter with an imaging apparatus, such as a camera, while moving with the imaging apparatus in hand.

However, it is preferable to improve the operability of the imaging apparatus in order to easily extract the additional information.

SUMMARY OF THE INVENTION

The invention has been made in view of the above-mentioned problems and an object of the invention is to provide an image processing apparatus, an image processing method, and a storage medium that notify a user of information such that the user can easily and effectively perform an extraction operation using an imaging unit.

According to an aspect of the invention, there is provided an image processing apparatus including: an imaging unit configured to capture an image of a printed matter in which additional information has been embedded by an electronic watermark; an extraction unit configured to perform an extraction process of extracting the additional information from captured image information obtained by the imaging unit; and a notification unit configured to notify information indicating that the imaging unit is in a stage of preparation for the extraction process in a case where a positional relationship between the printed matter and the imaging unit satisfies some of conditions for starting the extraction process.

According to the invention, a positional relationship between an imaging unit and a position where additional information is embedded in a printed matter is notified such that the user can easily and effectively perform an extraction operation using the imaging unit.

Further features of the present invention will become apparent from the following description of exemplary embodiments with reference to the attached drawings.

BRIEF DESCRIPTION OF THE DRAWINGS

FIGS. 9A and 9B are diagrams illustrating examples of a space filter used in the additional information separation apparatus;

FIG. 12 is a diagram illustrating an example of a thinning table used for a thinning process;

FIG. 13 is a diagram illustrating another example of the thinning table used for the thinning process;

FIGS. 14A and 14B are diagrams schematically illustrating the posture of an imaging apparatus during imaging;

DESCRIPTION OF THE EMBODIMENTS

Figure 1:
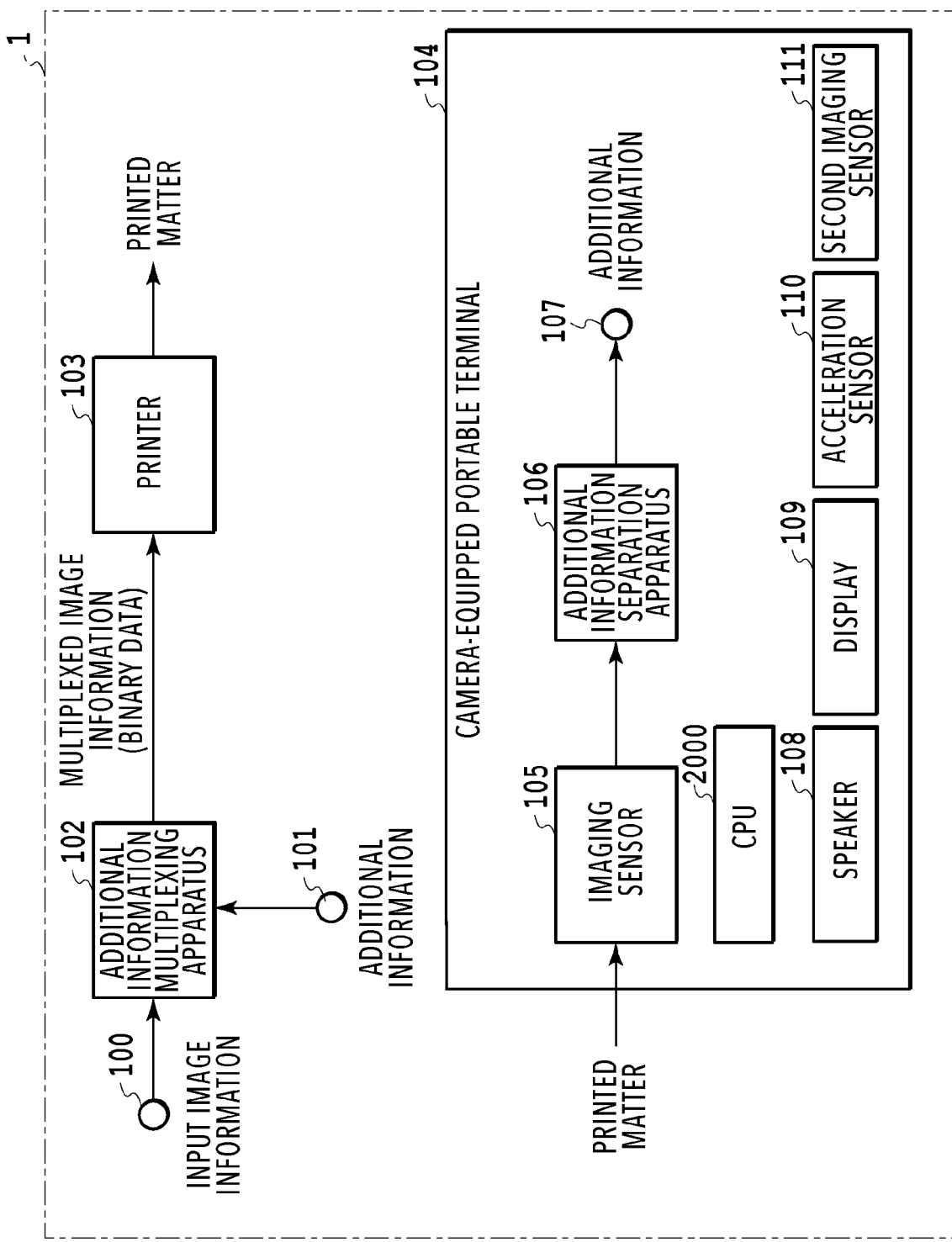
FIG. 1 is a block diagram illustrating the overall configuration of an image processing system according to an embodiment of the invention.

Hereinafter, embodiments of the invention will be described in detail with reference to the drawings. However, the configuration described in the following embodiments is just illustrative and the scope of the invention is not limited to only the following embodiments.

In the specification, "printing" (in some cases, also referred to as "print" or "recording") means not only forming meaningful information, such as characters and figures, but also forming information regardless of whether the information is meaningful or meaningless. In addition, the term "printing" includes forming, for example, an image, a figure, and a pattern on a print medium, regardless of whether information is visualized so as to be visually recognized by the eyes, and processing a medium in a broad sense.

The "print medium" includes media to which ink can be given, such as cloth, plastic films, metal plates, glass, ceramics, wood, and leather, in addition to paper used by a general printing apparatus.

In addition, "reading" by an imaging unit (apparatus) means a process (extraction process) of extracting information formed on a printed matter by the imaging unit and is also referred to as extraction.

Furthermore, "additional information" indicates information to be embedded in a printed matter or information embedded in a printed matter. The additional information is embedded in a printed matter so as not to be visually recognized. In some cases, in the following description, embedding the additional information is referred to as "adding", "multiplexing", or "superimposing" the additional information.

A matter that has been printed (recorded) on a print medium is referred to as a printed matter. The printed matter includes an image that can be seen by the eyes and a matter in which additional information is embedded (multiplexed) such that it is not capable of being visually recognized or it is less likely to be visually recognized. The printed matter in which the additional information has been multiplexed and embedded is referred to as a "multiplexed printed matter".

(Image Processing System)

An image processing system according to this embodiment includes an additional information multiplexing apparatus that embeds additional information in a printed matter and an image processing apparatus such as an additional information separation apparatus that performs a process of extracting the additional information from the printed matter. The functions of the additional information multiplexing apparatus can be implemented by printer driver software for creating image information to be output to a printer engine or a multi-function apparatus such as a computer or a smart phone including, for example, application software. In addition, the functions of the additional information multiplexing apparatus can be implemented by software and hardware provided in, for example, a copier, a facsimile, or a printer body.

Examples of the additional information separation apparatus include a mobile phone, a smart phone, and a tablet PC having an imaging function of a camera. Hereinafter, a portable device having the imaging function is referred to as a camera-equipped portable terminal. In addition, the functions of the additional information separation apparatus can be implemented by a series of apparatuses that separates additional information from image information captured by a digital camera using application software in a computer.

(Additional Information Multiplexing Apparatus)

FIG. 1 is a block diagram illustrating the configuration of an image processing system 1 according to an embodiment of the invention. In the image processing system 1 according to this embodiment, multi-gradation input image information is input from an input terminal 100 and additional information to be embedded in the input image information is input from an input terminal 101. In recent years, various kinds of information have been used as the additional information. For example, various kinds of information, such as sound information, moving image information, text document information, copyright information, all information related to an input image including the imaging date and time, an imaging location, and a photographer, and image information different from the input image information, can be embedded as the additional information in the input image information.

An additional information multiplexing apparatus 102 embeds the additional information in the input image information such that the additional information is less likely to be visually recognized. The additional information multiplexing apparatus 102 performs a process of multiplexing the additional information in a case where the multi-gradation input image information is quantized. Then, the quantized multiplexed image information is transmitted to a printer 103. The configuration of the additional information multiplexing apparatus 102 will be described in detail below.

The printer 103 prints an image on a predetermined print medium on the basis of the input multiplexed image information to create a printed matter. In this embodiment, a printer, such as an ink-jet printer or a laser printer that expresses gradation using a pseudo gradation process, can be used. A camera-equipped portable terminal (image processing apparatus) 104 captures an image of the printed matter created by the printer 103.

The camera-equipped portable terminal 104 includes, for example, an imaging sensor 105 that captures an image of information on the printed matter and an additional information separation apparatus 106 that separates the additional information from the captured image information. In addition, the camera-equipped portable terminal 104 includes output apparatuses, such as a speaker and a display, and a plurality of sensors, such as an acceleration sensor 110 and a second imaging sensor 111.

Image information obtained by capturing the image of the printed matter using the imaging sensor (imaging unit) 105 is transmitted to the additional information separation apparatus (extraction unit) 106. The additional information embedded in the printed matter is extracted (separated) and is then output to an output terminal 107. The output terminal 107 is an interface for outputting the obtained additional information and outputs the additional information to an output apparatus corresponding to the type of additional information. For example, in a case where the obtained information is sound information, the sound information is output to a speaker (sound output unit) 108 which is one of notification units of the camera-equipped portable terminal 104. In a case where the obtained information is image information, the image information is output to a display 109 (display unit) which is one of the notification units. In addition, the output terminal 107 may be an interface that outputs data to an external device. In a case where the camera-equipped portable terminal 104 includes a plurality of imaging sensors, the second imaging sensor 111 may capture the image of the printed matter. In this embodiment, the camera-equipped portable terminal 104 includes a multiplexing application. The camera-equipped portable terminal 104 can generate print information in which the additional information has been embedded or can extract the additional information from the printed matter, using the multiplexing application. In addition, the camera-equipped portable terminal 104 includes a CPU 2000. The CPU 2000 controls the process of the camera-equipped portable terminal 104. The CPU 2000 reads a program from a memory and executes the program to perform each step of a flowchart which will be described below.

Figure 2:
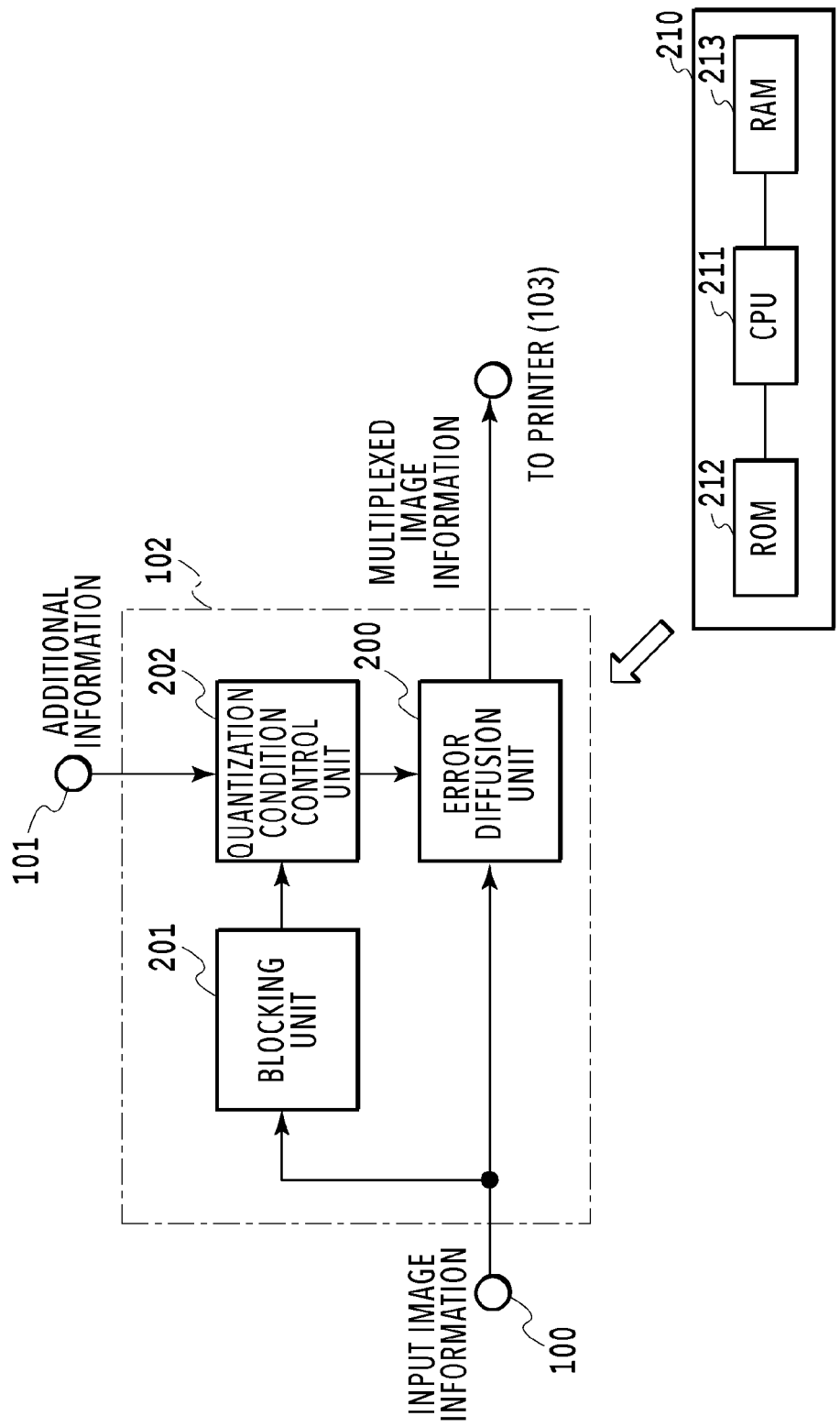
FIG. 2 is a block diagram illustrating the configuration of an additional information multiplexing apparatus illustrated in FIG. 1.

FIG. 2 is a functional block diagram illustrating the configuration of the additional information multiplexing apparatus 102 illustrated in FIG. 1. The additional information multiplexing apparatus 102 performs a pseudo gradation process using an error diffusion method for the image information input from the input terminal 100 to convert the image information into quantization levels whose number is smaller than the number of input gradations and areally expresses gradations using the quantization values of a plurality of pixels. The error diffusion process will be described in detail below.

A blocking unit 201 performs a process of dividing the input image information into predetermined area units. The area blocked by the blocking unit 201 may have a rectangular shape or may have shapes other than the rectangular shape. A quantization condition control unit 202 changes and controls quantization conditions in each area blocked by the blocking unit 201 on the basis of the additional information input from the input terminal 101.

The above-mentioned functions of the additional information multiplexing apparatus 102 are implemented by a control unit including a CPU 211, a ROM 212, and a RAM 213 provided in, for example, the above-mentioned multifunction apparatus. That is, the CPU 211 performs various processes according to a control program stored in the ROM 212, using the RAM 213 as a work area, to implement the functions of the blocking unit 201, the quantization condition control unit 202, and an error diffusion unit 200.

Figure 3:
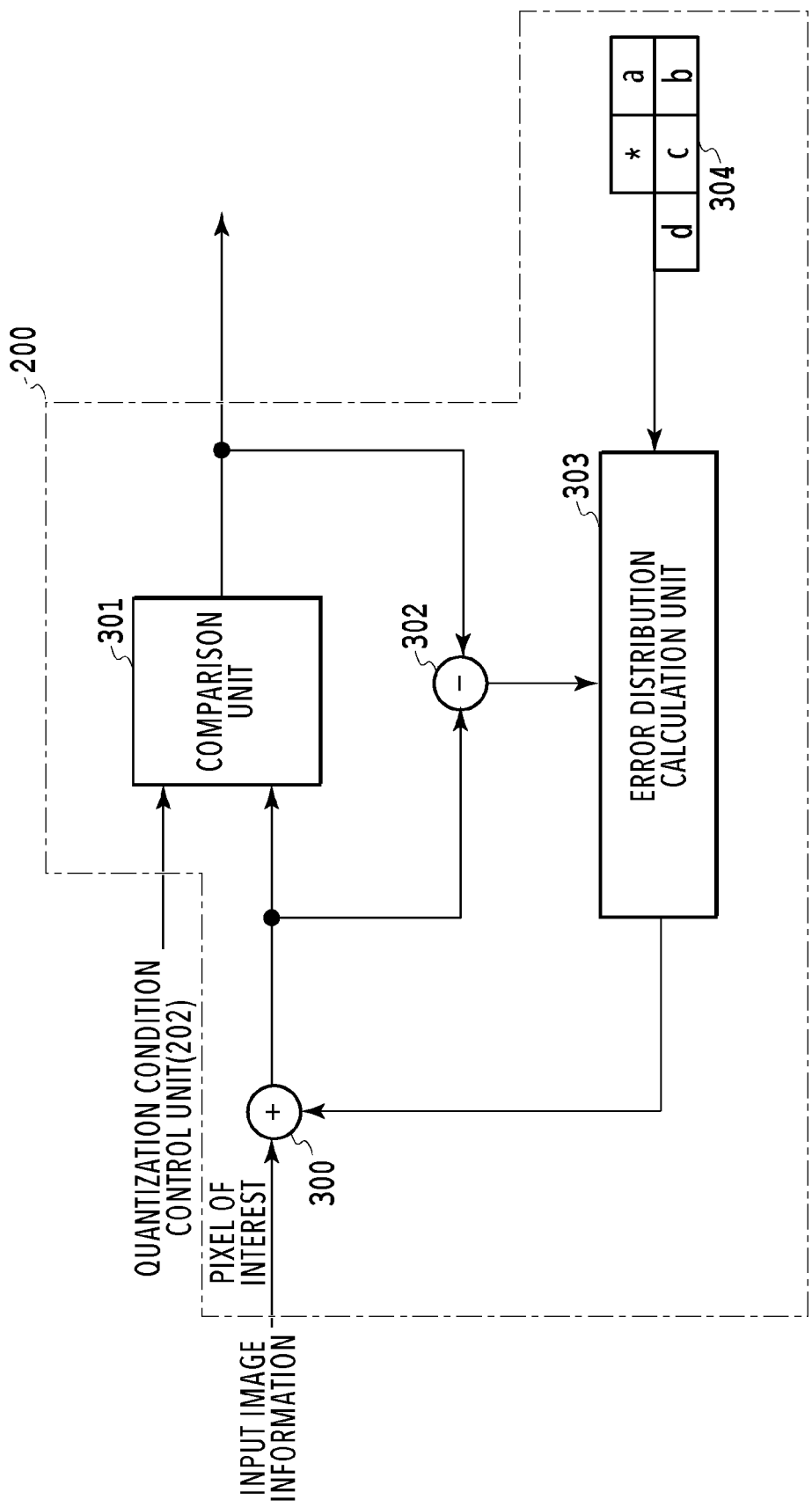
FIG. 3 is a block diagram illustrating an error diffusion process illustrated in FIG. 2.

FIG. 3 is a block diagram illustrating the configuration of the error diffusion unit 200. In this embodiment, an example of the error diffusion process which converts the input image information represented by multi-valued gradations into image information quantized with a binary gradation value will be described. An adder 300 adds the value of a pixel of interest in the input image information and a quantization error distributed from a binarized peripheral pixel and outputs the addition result.

A comparison unit 301 compares the addition result output from the adder 300 with a quantization threshold value output from the quantization condition control unit 202, outputs "1" in a case where the addition result is greater than the quantization threshold value, and outputs "0" in the other cases. For example, in a case where the gradation of the pixel is represented with an accuracy of 8 bits, the gradation is generally represented by a maximum value of "255" and a minimum value of "0". It is assumed that, in a case where the quantization value is "1", a dot is formed on a print medium with, for example, ink or toner.

A subtractor 302 calculates an error between the quantization result and the addition result. An error distribution calculation unit 303 calculates an error for the peripheral pixels to be subjected to the quantization process on the basis of the calculated error. For the distribution rate of the error, an error distribution table 304 that is experimentally determined on the basis of a relative distance from the pixel of interest is provided in advance and the error is distributed on the basis of the distribution rate described in the distribution table. A distribution table 304 illustrated in FIG. 3 is a distribution table corresponding to four peripheral pixels.

Then, the overall procedure of a process performed by the additional information multiplexing apparatus 102 including the quantization condition control unit 202 will be described with reference to a flowchart illustrated in FIG. 4. An example in which the quantization value is a binary value will be described. In Step S401, a variable i is initialized. The variable i is a variable for counting the address of a pixel in the vertical direction of an image. In Step S402, a variable j is initialized. The variable j is a variable for counting the address of a pixel in the horizontal direction of the image.

Figure 5:
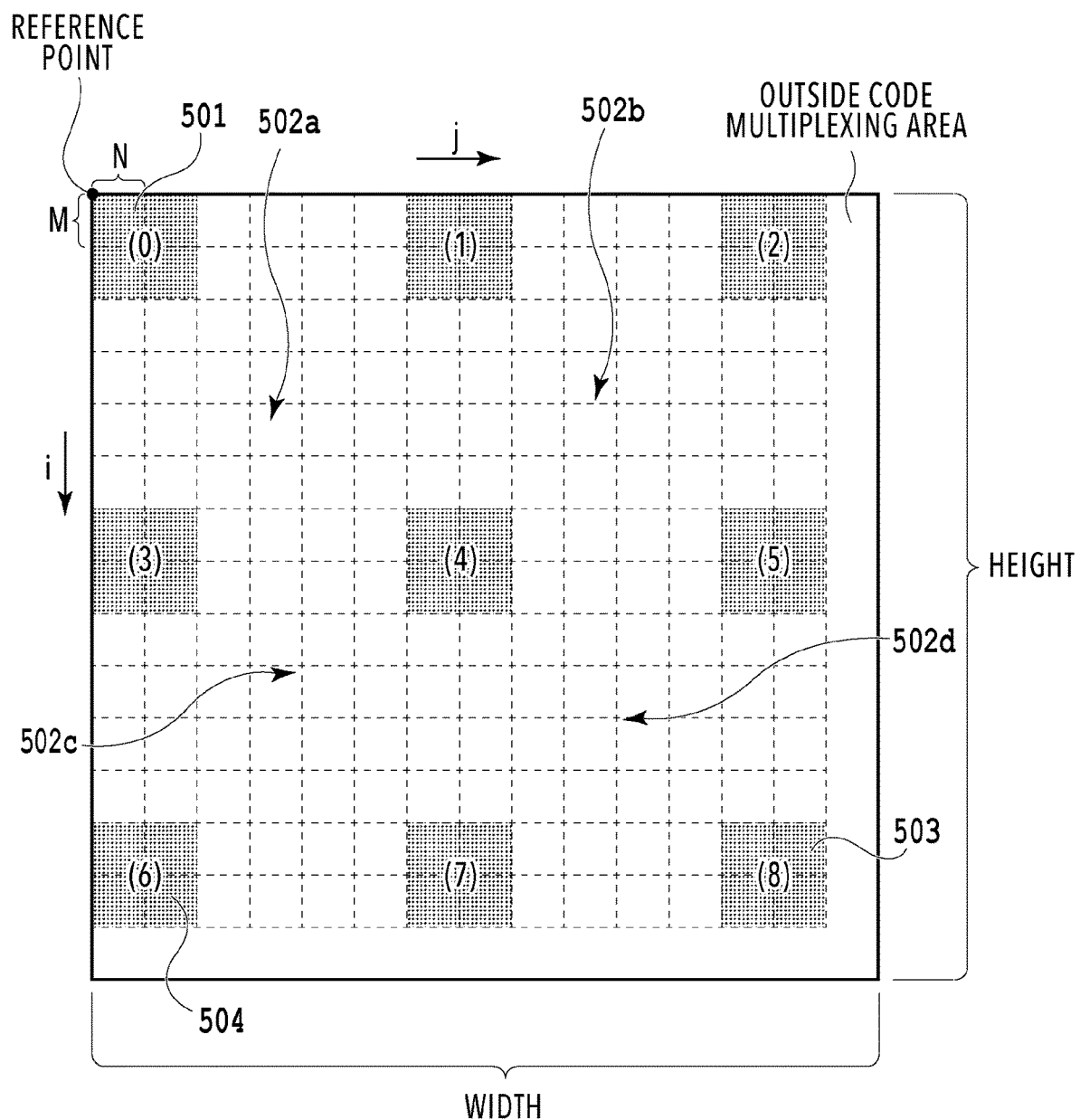
FIG. 5 is a diagram illustrating an additional information image.

Then, in Step S403, it is determined whether the pixels represented by the current process addresses i and j are included in the area to be subjected to the multiplexing process. Here, a multiplexing area will be described with reference to FIG. 5. FIG. 5 illustrates an example of the image in which the number of pixels in the horizontal direction is WIDTH and the number of pixels in the vertical direction is HEIGHT.

In the image illustrated in FIG. 5, the upper left corner is the origin and an area having N pixels in the horizontal direction and M pixels in the vertical direction is determined as one block. FIG. 5 illustrates an example in which blocking is performed using the origin as a reference point. However, blocks may be set using a point separated from the origin as the reference point. In a case where the maximum amount of information is multiplexed in the image, the blocks, each of which has N×M pixels, are arranged from the reference point. In a case where the number of blocks that can be arranged in the horizontal direction is W and the number of blocks that can be arranged in the vertical direction is H, the numbers of blocks W and H have the following relationship with the numbers of pixels in the horizontal and vertical directions:

$$W=\text{INT}(\text{WIDTH}/N) \quad \text{Expression 1}$$

$$H=\text{INT}(\text{HEIGHT}/M) \quad \text{Expression 2}$$

where INT( ) indicates an integer portion in ( ).

In Expressions 1 and 2, the remaining number of pixels that are indivisible corresponds to an area that is located at the end in a case where a plurality of N×M blocks are arranged and forms an area other than a code multiplexing area.

Figure 4:
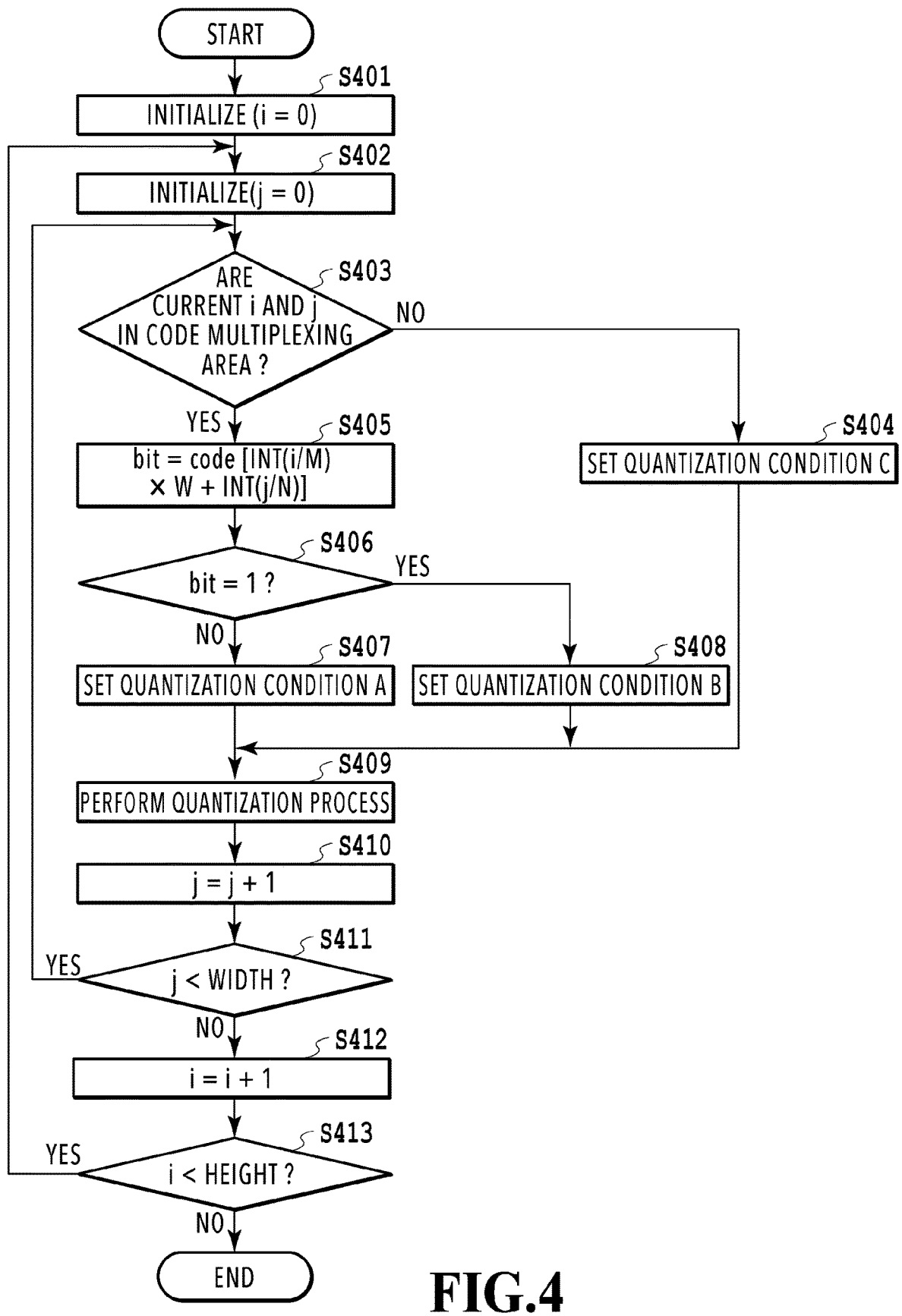
FIG. 4 is a flowchart illustrating an additional information multiplexing process.

In a case where it is determined in Step S403 of FIG. 4 that the pixel of interest that is currently being processed is outside the multiplexing area, a quantization condition C is set in Step S404. On the other hand, in a case where it is determined that the pixel of interest that is currently being processed is inside the multiplexing area, the process proceeds to Step S405 and information to be multiplexed is read.

Positional information and additional information are multiplexed in the multiplexing area. A hatched mass (a block of N×M pixels) 501 illustrated in FIG. 5 indicates the positional information embedded (multiplexed) in the image. Nine sets of the positional information, each of which includes the hatched masses, are arranged in the image. In addition, additional information items 502a to 502d are embedded (multiplexed) in an area surrounded by the positional information items.

Here, for ease of illustration, the positional information items are represented by position numbers (0) to (8). However, the positional information items are represented in detail by the number of blocks, the number of pixels, and the distance in the XY coordinate system, using a large number of hatched masses. It is assumed that each bit of the positional information and the additional information is represented by an array such as a code[ ]. For example, assuming that each of the positional information and the additional information is information corresponding to 196 (=14×14) bits, one bit is stored in each of the array codes[ ] from a code[0] to a code[195].

The positional information set 501 that is closest to the reference point and has position number (0) is multiplexed as information "0000" using four blocks (bits). A positional information set 503 that is furthest from the reference point and has position number (8) is multiplexed as information "1000" using four blocks (bits). Similarly, a positional information set 504 that has position number (6) is multiplexed as information "0110" using four blocks (bits).

The additional information 502a is surrounded by the positional information items with the position numbers (0), (1), (3), and (4). In a case where the positional information items can be obtained by the imaging sensor, it can be determined that the imaging sensor is located at the position where the additional information 502a can be read. That is, in a case where the position numbers (1) to (4) have been obtained during reading, the additional information 502a can be read. It is possible to perform the process of reading (extracting) the additional information 502b only in a case where the positional information items with the position numbers (1), (2), (4), and (5) have been extracted. Similarly, it is possible to read the additional information 502c in a case where the positional information items with the position numbers (3), (4), (6), and (7) have been extracted and it is possible to read the additional information 502d in a case where the positional information items with the position numbers (4), (5), (7), and (8) have been extracted. In other words, four positional information items are determined as the conditions in which an additional information reading operation can start and the additional information extraction process is performed only in a case where the imaging sensor 105 is located at the position where it can extract all of the positional information items. Therefore, the additional information reading process is not performed only in a case where some of the conditions of the four positional information items are not satisfied (only the positional information items with position numbers 1 to 3 are obtained).

In Step S405, the quantization condition control unit 202 determines a variable bit to be allocated to the block including the pixel of interest that is currently being processed, on the basis of the additional information to be multiplexed. Information in the array code[ ] is substituted into the variable bit as follows:

bit=code[INT($i/M$)×$W$+INT($j/N$)]   Expression 3

Then, in Step S406, it is determined whether the variable bit is "1". As described above, since information represented by one bit is stored in each array code[ ], the value of the variable bit is "0" or "1". In a case where it is determined in Step S406 that the variable bit is "0", a quantization condition A is set in Step S407. In a case where it is determined that the variable bit is "1", a quantization condition B is set in Step S408. Then, in Step S409, the quantization process is performed on the basis of the set quantization conditions. The quantization process corresponds to the error diffusion method described in FIG. 3.

Then, in Step S410, the variable j in the horizontal direction is counted up. In Step S411, it is determined whether the variable j is less than WIDTH that is the number of pixels in the horizontal direction in the image. The process from Step S403 to Step S411 is repeated until the number of pixels processed is equal to WIDTH. In a case where the process for the number of pixels WIDTH in the horizontal direction ends, the variable i in the vertical direction is counted up in Step S412. In Step S413, it is determined whether the variable i is less than HEIGHT that is the number of pixels in the vertical direction in the image. The process from Step S402 to Step S413 is repeated until the number of pixels processed is equal to HEIGHT. The quantization conditions can be changed in each block of N×M pixels by the above-mentioned operation.

Here, examples of the quantization conditions A, B, and C will be described. There are various factors in the quantization conditions of the error diffusion method. In this embodiment, the quantization condition is a quantization threshold value. Since the quantization condition C is a condition that is set outside the multiplexing area, the quantization threshold value can be set to any value. As described above, in a case where the gradation of a pixel is represented by 8 bits and the quantization level is a binary value, a maximum gradation value of "255" and a minimum gradation value of "0" are quantization representative values. In this case, an intermediate value of "128" is generally set as the quantization threshold value. That is, in the quantization condition C, the quantization threshold value is fixed to "128".

In contrast, the quantization condition A and the quantization condition B are the conditions that are used in the block inside the multiplexing area. Therefore, a difference in image quality needs to occur due to the difference between the quantization conditions. However, it is preferable that the difference in image quality is expressed so as not to be visually recognized and can be easily identified from the print medium.

Figure 6A:
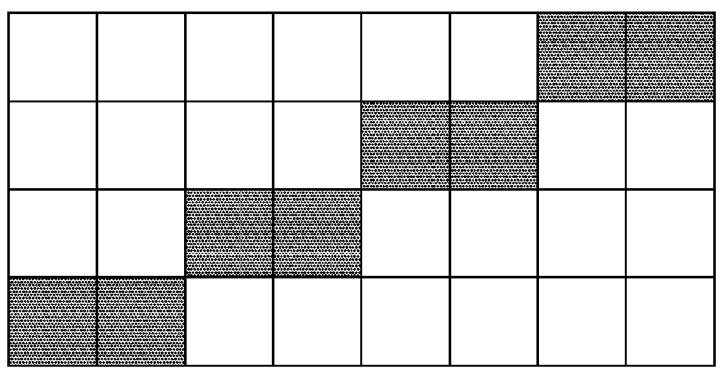
FIGS. 6A and 6B are diagrams illustrating multiplexing quantization conditions.
Figure 6B:
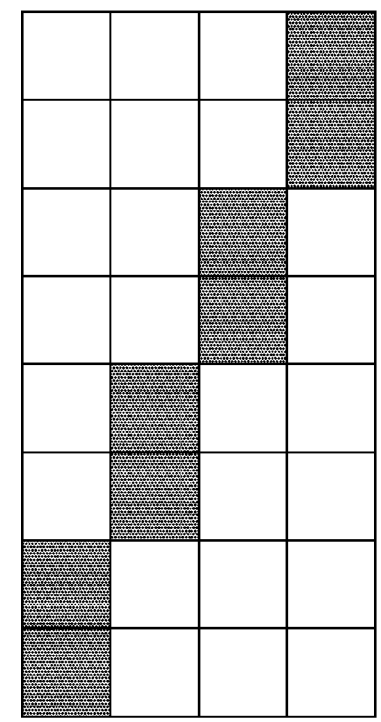

FIGS. 6A and 6B illustrate examples of the quantization conditions A and B. FIG. 6A is a diagram illustrating the change cycle of the quantization threshold value in the quantization condition A. In FIG. 6A, it is assumed that one mass is one pixel, a white mass is a fixed threshold value, and a hatched mass is a variable threshold value. That is, in the example illustrated in FIG. 6A, a matrix including 8 pixels in the horizontal direction and 4 pixels in the vertical direction is created and a singular value of the threshold values of the hatched masses is set as the threshold value.

FIG. 6B is a diagram illustrating the change cycle of the quantization threshold value in the quantization condition B, similarly to FIG. 6A. In the example illustrated in FIG. 6B, unlike FIG. 6A, a matrix including 4 pixels in the horizontal direction and 8 pixels in the vertical direction is created and a singular value of the threshold values of the hatched masses is set as the threshold value.

In a case where one pixel is represented by an 8-bit gradation value as described above, for example, the fixed threshold value is set to "128" and the singular threshold value is set to "10". In a case where the quantization threshold value is small, the quantization value of the pixel of interest is likely to be "1" (quantization representative value "255"). That is, a sequence of the quantization values "1" is likely to occur due to the sequence of the hatched masses in FIGS. 6A and 6B. In other words, a block in which dots are generated by the sequence of the hatched masses illustrated in FIG. 6A and a block in which dots are generated by the sequence of the hatched masses illustrated in FIG. 6B are mixed in each block of N×M pixels.

A method has been described above which superimposes a predetermined periodicity indicating the sign (bit) of the additional information on the quantization threshold value of the error diffusion method to express multiplexing. However, a multiplexing method is not limited thereto. For example, the following methods may be used:

A method that directly superimposes periodicity on RGB brightness information; and A method that separates RGB brightness information into brightness-color difference information (for example, Y, Cr, and Cb signals, XYZ signals, and L*a*b* signals) and multiplexes periodicity.

In addition, a method may be used which separates RGB brightness information ink color (for example, CMYK) signals and multiplexes periodicity, that is, does not multiplex periodicity in the quantization threshold value, but directly multiplex periodicity in image data. That is, a method may be used in which a pixel with a predetermined period is plus α (or minus α) and the other pixels are minus α (or plus α). In the above-mentioned example, the quantized information is transmitted to the printer 103. However, the multiplexing process and the quantization process may be performed in the printer 103.

(Additional Information Separation Apparatus)

Next, the additional information separation apparatus 106 of the image processing system illustrated in FIG. 1 will be described.

Figure 7:
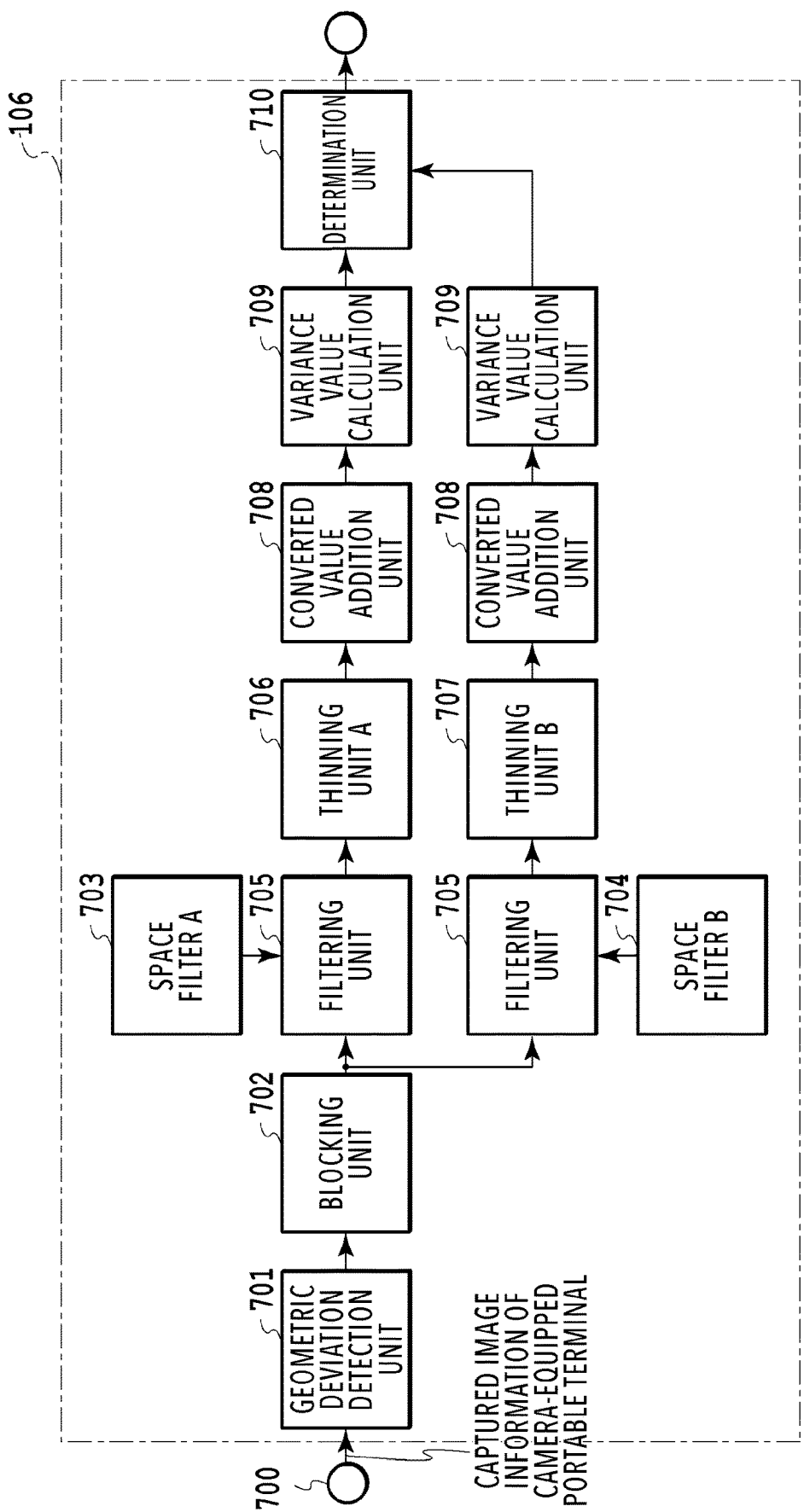
FIG. 7 is a block diagram illustrating the configuration of an additional information separation apparatus illustrated in FIG. 1.

FIG. 7 is a block diagram illustrating the configuration of the additional information separation apparatus 106. For ease of description, similarly to the additional information multiplexing apparatus 102, an example in which the additional information is separated (extracted) from the printed matter in which 1-bit additional information items have been multiplexed in the divided block will be described. In this case, the amount of additional information per block in the additional information multiplexing apparatus 102 is equal to the amount of separated information per block in the additional information separation apparatus 106.

The image information read (captured) by the camera-equipped portable terminal 104 is input to an input terminal 700. It is preferable that the resolution of the imaging sensor of the camera-equipped portable terminal 104 used is equal to or greater than the resolution of the printer which creates a printed matter. The resolution of the imaging sensor needs to be equal to or greater than two times the resolution of the printer on the basis of a sampling theorem in order to accurately read the positional information of dots of the printed matter. However, in the case of an image sensor having the same resolution as the printer, it is difficult to accurately determine the position of scattered dots, but it is possible to determine the position of the scattered dots to some extent. In a first embodiment, for ease of description, a case in which the printer and the imaging sensor have the same resolution is assumed.

A geometric deviation detection unit 701 detects the geometric deviation of the image captured by the camera-equipped portable terminal 104. The image information transmitted from the input terminal 700 is obtained by capturing the output from the printer and the image output from the printer using the camera-equipped portable terminal 104. Therefore, in some cases, there is a large geometric deviation between the output image information and the image information (the image information input to the printer) before being output from the printer. For this reason, the geometric deviation detection unit 701 detects a boundary line between an image $I_{m1}$ of a printed matter and areas other than the image of the printed matter in an image $I_m$ captured as illustrated in FIG. 8, using edge detection.

Figure 8:
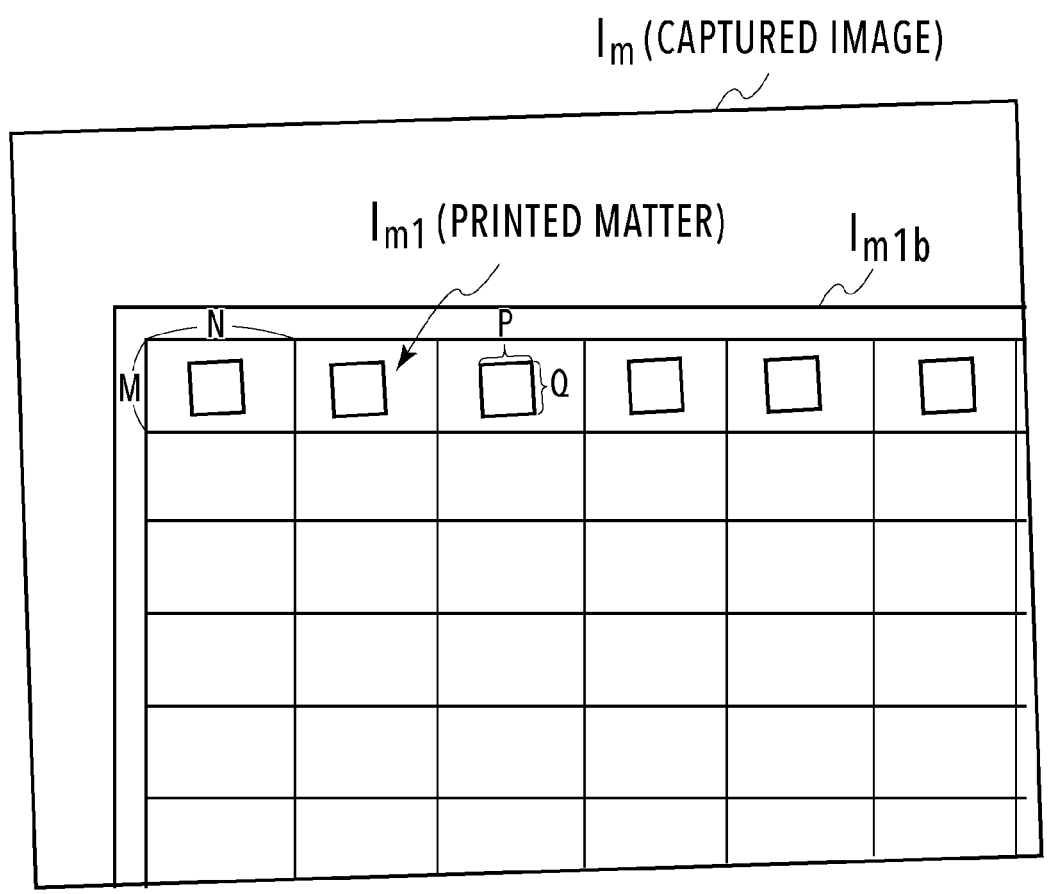
FIG. 8 is a diagram illustrating an example of a positional relationship between a captured image and a print image included in the captured image.

FIG. 8 is a diagram illustrating a captured image. In a case where the resolution of the printer is equal to the resolution of the imaging sensor, the rotation direction (inclination) of the image is a main factor to be corrected due to, for example, the oblique movement of the printer at the time of printing on a print medium and the deviation when the camera-equipped portable terminal 104 is placed above the printed matter. Therefore, in a case where the boundary line of the printed matter is detected, it is possible to determine the degree of deviation in the rotation direction.

A blocking unit 702 divides the image input from the input terminal 700 into blocks each of which has P pixels in the horizontal direction and Q pixels in the vertical direction. The size of the block is smaller than that of the block of N×M pixels obtained in a case where an electronic watermark is superimposed. That is, the following relationship is established:

$P \leq N$ and $Q \leq M$   Expression 4

The division of the image into each block of P×Q pixels is skipped at a predetermined interval. That is, blocking is performed such that one block of P×Q pixels is included in an area which is assumed as a block of N×M pixels during multiplexing (see FIG. 8). The number of skip pixels is basically N pixels in the horizontal direction and M pixels in the vertical direction. It is necessary to divide the amount of deviation detected by the geometric deviation detection unit 701 by the number of blocks to calculate the amount of deviation per block and to add the amount of deviation to the number of skip pixels for correction.

Space filters A703 and B704 have different characteristics. A filtering unit 705 is a digital filtering unit that calculates the sum of the products of peripheral pixels. Each filtering unit 705 is a digital filtering unit that calculates the sum of the products of peripheral pixels. Each filtering unit 705 performs a filtering process using the space filter A703 or the space filter B704. Each coefficient of the space filter is created according to the period of the variable threshold value of the quantization conditions during multiplexing.

FIGS. 9A and 9B illustrate examples of the space filters that are used by the additional information separation apparatus 106 to separate the additional information which has been multiplexed using the quantization conditions having the periodicity illustrated in FIGS. 6A and 6B. FIG. 9A illustrates an example of the space filter A703. FIG. 9B illustrates an example of the space filter B704. In FIGS. 9A and 9B, among 5×5 pixels, a center pixel corresponds to the pixel of interest. The other 24 pixels correspond to the peripheral pixels. In FIGS. 9A and 9B, a blank pixel indicates that the filter coefficient is "0". Values described in the pixels other than the blank pixels are filter coefficients.

As can be seen from FIGS. 9A and 9B, FIGS. 9A and 9B illustrate edge enhancement filters. The directionality of the edge to be enhanced is matched with the directionality of the variable threshold value during multiplexing. That is, the space filter A703 illustrated in FIG. 9A is created so as to be matched with FIG. 6A. The space filter B704 illustrated in FIG. 9B is created so as to be matched with FIG. 6B. The filtering units 705 perform a filtering process for each block of P×Q pixels using the space filter A703 and the space filter B704.

A thinning unit A706 and a thinning unit B707 performs a thinning process for the filtered signal (hereinafter, referred to as a converted value) in the block of P×Q pixels on the basis of a predetermined regularity. In this embodiment, the thinning process separates thinning regularity into periodicity and a phase. That is, the thinning unit A706 and the thinning unit B707 have different thinning periodicities. Each thinning unit performs a plurality of thinning processes that change the phase. A thinning method will be described in detail below.

Converted value addition units 708 add the converted values thinned by the thinning unit A706 and the thinning unit B707 to each phase. The thinning process and the converted value addition process correspond to the extraction of the power of a predetermined frequency vector enhanced by the space filter.

A variance value calculation unit 709 calculates the variance of a plurality of added values, which have been calculated for each phase, for each periodicity. A determination unit 710 determines a multiplexed code (that is, "0" or "1") on the basis of the variance of the periodicities calculated by the variance value calculation units 709. This will be described in detail below.

Figure 10:
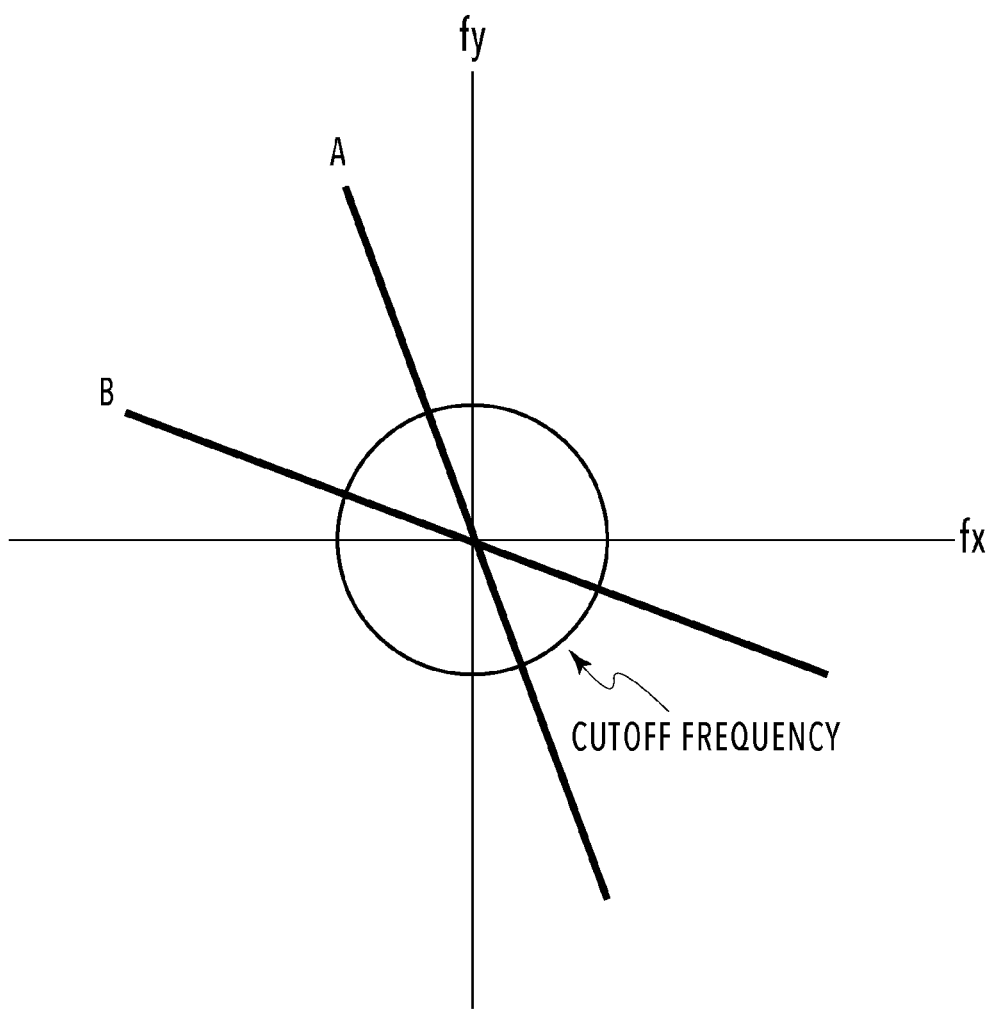
FIG. 10 is a diagram illustrating a frequency vector in a two-dimensional frequency range.

FIG. 10 is a diagram schematically illustrating the first embodiment in a two-dimensional frequency range. The horizontal axis indicates a frequency in the horizontal direction and the vertical axis indicates a frequency in the vertical direction. The origin at the center indicates a direct-current component and the frequency increases as the distance from the origin increases. In FIG. 10, a circle indicates a cutoff frequency by error diffusion. The filter characteristics of the error diffusion method are the characteristics of a high-pass filter (HPF) in which a low-frequency range is cut off. The cut-off frequency varies depending on the density of a target image.

In this embodiment, the frequency characteristics generated after quantization are changed by control for switching the quantization condition (quantization threshold value) in a case where the additional information is added. In a case where the quantization condition illustrated in FIG. 6A is used, a large power spectrum is generated on a frequency vector A illustrated in FIG. 10. In a case where the quantization condition illustrated in FIG. 6B is used, a large power spectrum is generated on a frequency vector B illustrated in FIG. 10. In a case where the additional information is separated, the frequency vector on which the large power spectrum is generated is detected to determine the multiplexed signal. In this embodiment, a process of individually enhancing and extracting each frequency vector is performed.

FIGS. 9A and 9B correspond to HPFs having the directionality of a specific frequency vector. That is, in the space filter illustrated in FIG. 9A, it is possible to enhance the frequency vector on the straight line A illustrated in FIG. 10. In the space filter illustrated in FIG. 9B, it is possible to enhance the frequency vector on the straight line B illustrated in FIG. 10.

For example, it is assumed that, in a case where a quantization process (error diffusion process) is performed using the quantization condition illustrated in FIG. 6A, a large power spectrum is generated on the frequency vector represented by the straight line A illustrated in FIG. 10. In this case, the amount of change in the power spectrum is amplified in the space filter illustrated in FIG. 9A and is hardly amplified in the space filter illustrated in FIG. 9B. That is, in a case where a plurality of space filters are arranged in parallel and perform filtering, the power spectrum is amplified only in the space filters in which the frequency vectors are matched with each other and is hardly amplified in the other filters. Therefore, it is possible to easily specify the frequency vector on which a large power spectrum is generated.

Figure 11:
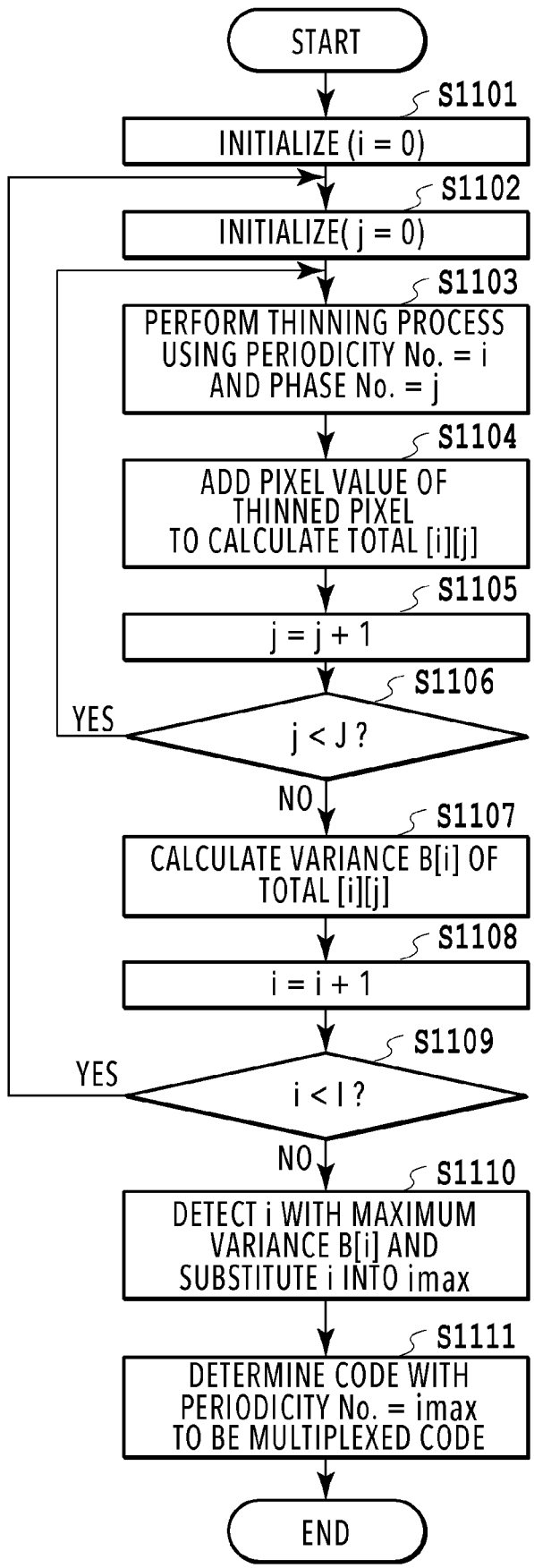
FIG. 11 is a flowchart illustrating an additional information separation process.

FIG. 11 is a flowchart illustrating the operation sequence of the thinning unit A706, the thinning unit B707, the converted value addition unit 708, the variance value calculation unit 709, and the determination unit 710 illustrated in FIG. 7. In FIG. 11, in Step S1101 and Step S1102, a variable initialization process is performed. Specifically, a process of initializing the values of the variables i and j used in this flow to 0 is performed. First, the overall process will be described with reference to FIG. 11 and then a specific example will be described with reference to FIGS. 12 and 13.

In Step S1103, the regularity factors of the thinning process performed by the thinning unit A706 and the thinning unit B707 are determined. That is, a process of determining two factors, that is, "periodicity" and a "phase" is performed. In this flow, it is assumed that a variable related to the periodicity is "i" and a variable related to the phase is "j". The conditions of the periodicity and the phase are managed by numbers. In Step S1103, the regularity factors of the thinning process having periodicity number (hereinafter, abbreviated to No.) i and phase No. j at that time are set. Then, the thinning process is performed on the basis of the set regularity factors.

In Step S1104, the converted value addition unit 708 adds the converted values in the block obtained by the thinning process. The added value is stored in a variable array TOTAL[i][j].

In Step S1105, the variable j is counted up. In Step S1106, the variable j is compared with a fixed value J. As the fixed value J, the number of times the thinning process is performed while the phase is changed is stored. In a case where the variable j is less than the fixed value J, the process returns to Step S1103 and the thinning process and the thinned pixel addition process are repeated using a new phase No. obtained by the variable j that has been counted up.

In a case where the thinning process, which is performed while the phase is changed, and the addition process are performed a set number of times (the number of times corresponding to the fixed value J), the process proceeds to Step S1107 and the variance value calculation unit 709 calculates the variance of the addition results TOTAL[i][j]. That is, a variation in each addition result depending on a phase difference is evaluated. Here, the factor i of the periodicity is fixed and the variance of J addition results TOTAL[i][j] is calculated. That is, the variance of TOTAL[i][0], TOTAL[i][1], ..., TOTAL[i][J] is calculated. The variance is stored in B[i].

In Step S1108, the variable i is counted up. In Step S1109, the variable i is compared with a fixed value I. As the fixed value I, the number of times the thinning process is performed while the periodicity is changed is stored. In a case where the variable i is less than the fixed value I, the process returns to Step S1102 and the thinning process and the converted value addition process are repeated again using the condition of a new periodicity No. obtained by the variable i that has been counted up.

In a case where i is determined to be greater than the set number of times in Step S1109, variances B[i] are calculated and stored. In Step S1110, the determination unit 710 detects the maximum value of the variance from a set of I variances. In addition, the determination unit 710 substitutes the detected value of i into a variable imax.

In Step S1111, the determination unit 710 determines a multiplexed code (separation information). That is, the determination unit 710 determines a code having imax as the periodicity No. to be the multiplexed code (separation information) and ends the process. Next, a specific example will be described.

FIGS. 12 and 13 are diagrams illustrating a specific example of a thinning method. Here, an example in which the number of periodicities is 2 (I=2) and the number of phases is 4 (J=4) will be described. In FIGS. 12 and 13, a thinning method in a case where the block size is P=Q=16 is illustrated in a table format. In FIGS. 12 and 13, one mass in a block corresponds to one pixel. In FIGS. 12 and 13, the block has a square shape (P=Q). However, the shape of the block is not limited to the square and the block may have shapes other than the rectangular shape.

FIG. 12 illustrates a thinning method (corresponding to the thinning unit A706 illustrated in FIG. 7) in a case where the periodicity No. is 0. FIG. 13 illustrates a thinning method (corresponding to the thinning unit B707 illustrated in FIG. 7) in a case where the periodicity No. is 1. In FIGS. 12 and 13, a value written in each pixel of the block indicates a thinning pixel with phase No. j. For example, a pixel represented by "0" corresponds to a thinning pixel in a case where j is 0. That is, FIGS. 12 and 13 correspond to a thinning method in a case where there are four phases and the phase No. j is from 0 to 3.

In FIG. 12, the periodicity is matched with the periodicity illustrated in FIG. 6A. In FIG. 13, the periodicity is matched with the periodicity illustrated in FIG. 6B. As described above, the quantization value "1" (in the case of a binary value "0" or "1") is likely to be arranged by the sequences of the hatched masses illustrated in FIGS. 6A and 6B. Therefore, for example, in the case of the block under the quantization condition A during multiplexing, the quantization value "1" is likely to be arranged with the periodicity illustrated in FIG. 6A and a frequency component is further amplified in a case where the space filter is appropriate. Then, in a case where the converted values are thinned and added with the periodicity illustrated in FIG. 12, the variance of the addition results is large.

In a case where the block under the quantization condition A is filtered by an inappropriate space filter and thinning is performed with the periodicity illustrated in FIG. 13, the variance of the addition results of the converted values is small. That is, since the periodicity of the quantization value is different from the periodicity of thinning, the added value of the converted values by a difference in thinning phase is averaged and a variation in the added value is small. In contrast, in the block under the quantization condition B during multiplexing, the variance is small in the thinning process illustrated in FIG. 12 and is large in the thinning process illustrated in FIG. 13.

In a case where an example of the flowchart illustrated in FIG. 4 is applied, a bit of 0 is set to the quantization condition A and a bit of 1 is set to the quantization condition B. Therefore, in a case where the variance of the periodicity No. =0 is large, the bit can be determined to be 0. In contrast, in a case where the variance of the periodicity No. =1 is large, the bit can be determined to be 1.

That is, the association of the quantization condition with the characteristics of the space filter and the periodicity of the thinning condition makes it possible to easily multiplex the additional information and to easily separate the additional information. In this embodiment, there are two types of periodicity Nos., that is, 0 and 1 and the multiplexed code in the block is 1 bit. However, the multiplexed code may be equal to or greater than 1 bit. The type of quantization condition, the type of space filter, and the type (the value of I) of the periodicity No. of the thinning condition are matched with each other.

In this embodiment, it is possible to easily separate codes, without comparing the power value of the frequency corresponding to the regularity of the quantization conditions using orthogonal transformation. In addition, it is possible to achieve a separation process at a very high speed since the process is performed in a real space.

The quantization conditions A and B, the space filters A and B, and the thinning units A and B are illustrative and the invention is not limited thereto. For example, other periodicities may be used and the number of taps in the space filter and a thinning block size may be greater or less than those in the above-mentioned examples.

As the process illustrated in FIG. 11, the repeat process using the variable i indicating the periodicity No. and the variable j indicating the phase No. has been described. However, in practice, a repeat process using pixel addresses in a block of P×Q pixels is easily achieved. That is, as illustrated in FIGS. 12 and 13, two kinds of information, that is, the periodicity No. and the phase No. are stored as a table for each pixel address in the block. Then, the converted value may be added to each of the variables of the corresponding the periodicity No. and the phase No. In this processing method, it is possible to calculate the added values of each of a set of the periodicity Nos. and a set of the phase Nos. in parallel only by processing P×Q pixels.

In the operation sequence illustrated in FIG. 11, the variance of the addition results of the thinned converted values after spatial filtering is calculated and a code is determined on the basis of the comparison result of the variances. However, the invention is not limited thereto. A method using the comparison between evaluation functions without using a variance is also considered. A bias in the addition result of the thinned converted values is likely to be prominent only in one phase in a case where the phase is shifted. Therefore, the "degree of variation" is preferably evaluated.

For example, the following evaluation functions other than the variance are considered in order to evaluate the degree of variation:

1. A difference between the maximum value and the minimum value of the added value of the thinned converted values;

2. A difference between the maximum value and the second largest value of the added value of the thinned converted values or a difference between the minimum value and the second smallest value of the added value; and 3. The maximum value of two consecutive differences in a case where a histogram is created by the added value of the thinned converted values.

The evaluation functions 1, 2, and 3 are absolute difference values. The relative ratio of the difference values to the converted values or the sum of pixel values or the converted values may be used as the evaluation function. In this example, the quantization value is binarized. However, the invention is not limited thereto.

As described above, according to this embodiment, an image is divided into blocks each of which includes M×N pixels, the quantization conditions are changed in each block, and the image is quantized according to the quantization conditions. Therefore, it is possible to embed predetermined information in the image. As a result, the deterioration of image quality can be less than that in an information embedment method according to the related art, for example, a method that embeds information using orthogonal transformation. In addition, it is possible to embed information in an image such that the information embedded at a high speed can be accurately extracted at a high speed.

(Image Capture and Notification of Camera-Equipped Portable Terminal)

Next, a characteristic process in this embodiment will be described. In this embodiment, in a case where the camera-equipped portable terminal captures the image of the printed matter (hereinafter, simply referred to as a multiplexed printed matter) on which the image having additional information embedded therein has been formed, the following characteristic process is performed. In the following description, a smart phone in which a display is provided on a side opposite to an imaging direction will be described as an example.

Figures 16A, 16B:
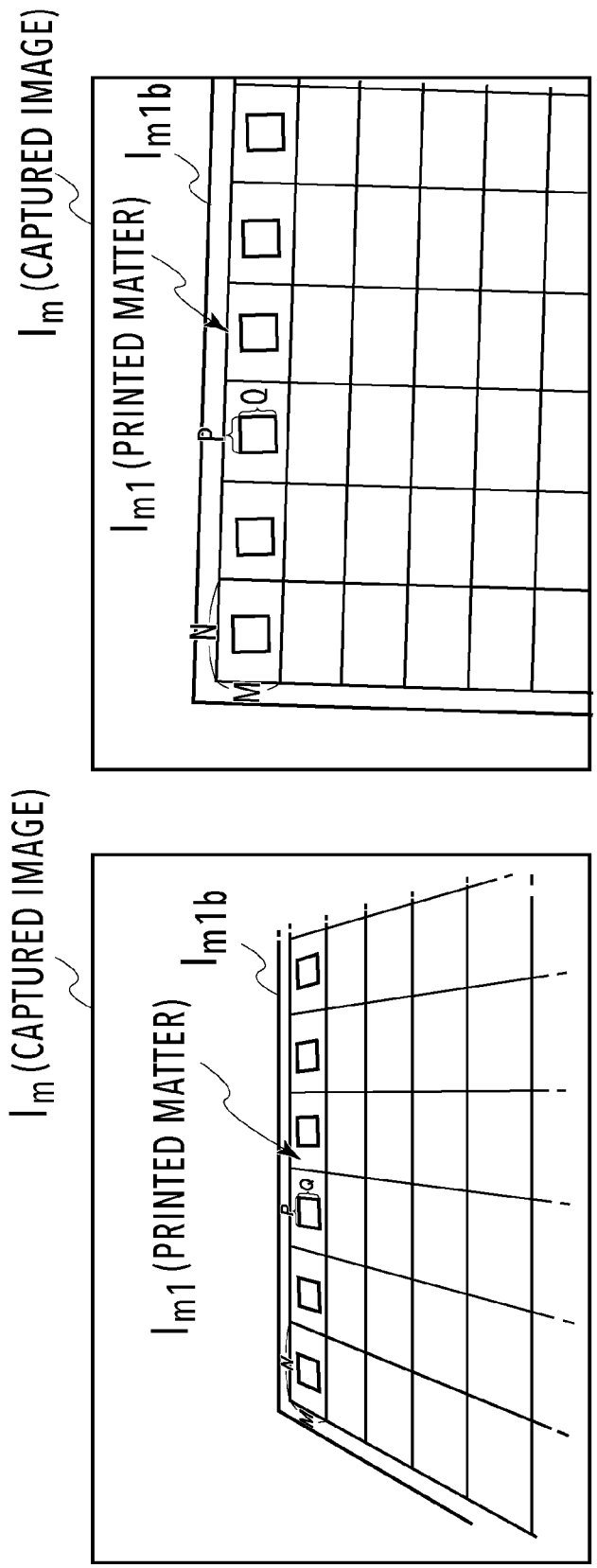
FIGS. 16A and 16B are diagrams illustrating examples of a captured image.

In a case where the smart phone is used to capture the image of the multiplexed printed matter, it is difficult for the user to determine the positional relationship between a smart phone 104 and a multiplexed printed matter 1401, such as an appropriate distance or an inclination, as illustrated in FIG. 14A. Therefore, in some cases, in the apparatus according to the related art, the distance of the camera-equipped portable terminal 104 from the multiplexed printed matter 1401 is too long or the inclination of the camera-equipped portable terminal 104 with respect to the multiplexed printed matter 1401 is too large. For example, in a case where the smart phone 104 is inclined with respect to the multiplexed printed matter 1401 as illustrated in FIG. 14A and captures the image of the multiplexed printed matter 1401, the captured image illustrated in FIG. 16A is obtained. That is, the distances of the camera-equipped portable terminal 104 from the front and rear sides of the multiplexed printed matter 1401 are different from each other. Therefore, for example, in a case where the front side of the multiplexed printed matter 1401 is in focus, the rear side thereof is out of focus, which results in blur. That is, in some cases, it is possible to separate (extract) the additional information embedded on the front side of the multiplexed printed matter 1401 and it is difficult to separate the additional information embedded on the rear side. Therefore, in order to prevent the front and rear sides of the multiplexed printed matter 1401 from being blurred, it is preferable to capture the image of the multiplexed printed matter 1401 with the smart phone 104 facing the multiplexed printed matter 1401 as illustrated in FIG. 14B. At that time, a captured image illustrated in FIG. 16B is obtained.

However, it is difficult for the user, who is not accustomed to reading, to set the positional relationship as illustrated in FIG. 14B. It is necessary to hold an imaging apparatus at an appropriate distance and an appropriate angle with respect to the printed image in order to appropriately read the image of the printed matter (including the additional information). That is, it is necessary to maintain a predetermined distance between the image and the imaging apparatus and to hold the imaging apparatus so as to face the image without being inclined, in order to appropriately read the additional information.

Therefore, first, it is necessary to move the imaging apparatus to an appropriate reading position (imaging position) in order to appropriately read the additional information. However, the user is less likely to recognize the position where the additional information is appropriately read, which makes it difficult to perform an additional information reading operation. For example, in a case where the imaging apparatus is not located at an appropriate position, the reading operation does not start and the "progress of the reading process" represented by, for example, a progress bar is not displayed. Therefore, it is difficult for the user to find an appropriate reading position with a UI such as a progress bar. For this reason, in this embodiment, the user is notified that the camera-equipped portable terminal (smart phone) 104 is close to the position where reading can be appropriately performed in an early stage such that the user is led to the appropriate position.

Figure 15:
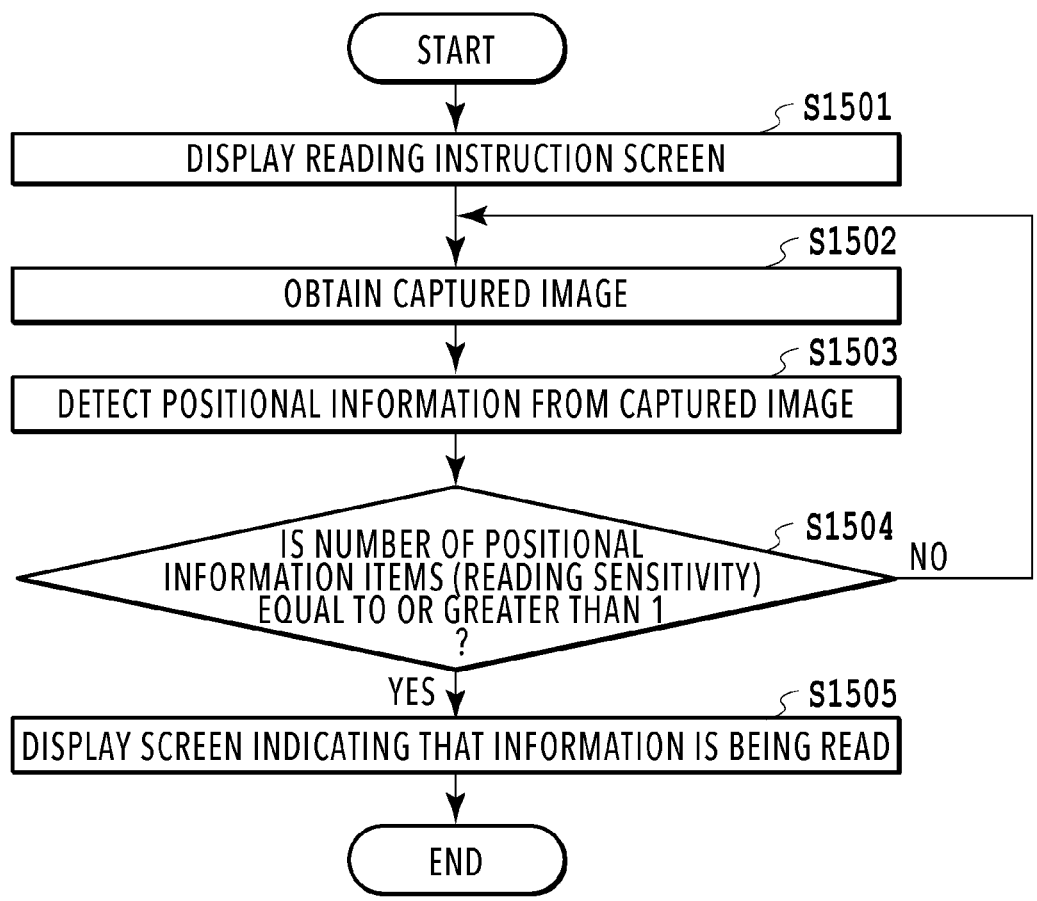
FIG. 15 is a flowchart illustrating a reading state notification process.

Here, a method for notifying that the positional relationship between the camera-equipped portable terminal 104 and the multiplexed printed matter 1401 is at a position close to the position (readable position) where, for example, the additional information is appropriately read will be described with reference to the flowchart illustrated in FIG. 15. In the following description, the position close to the readable position is referred to as a reading preparation position. In FIG. 15, in Step S1501, the CPU 2000 displays a reading instruction screen to instruct the user to perform reading. For example, the CPU 2000 displays a reading instruction screen indicating "Please put the smart phone above a picture" which is represented by 1701 in FIG. 17 on the display 109 of the smart phone. The reading instruction may be output as a sound from a speaker (not illustrated) of the smart phone 104. The user puts the camera-equipped portable terminal 104 above the multiplexed printed matter 1401 in response to the instruction.

In Step S1502, the CPU 2000 obtains the data of the image captured by the imaging sensor of the camera-equipped portable terminal 104. Then, in Step S1503, the CPU 2000 directs the additional information separation apparatus 106 to separate (extract) the positional information from the captured image information. As illustrated in FIG. 5, for example, the additional information 502a and the positional information items 501 and 503 with position numbers (0) to (8) are multiplexed in the multiplexed printed matter 1401. Since the positional information is embedded using four masses, the positional information is more easily separated (extracted) than the additional information embedded in each mass.

The positional information is dispersively arranged in the print image. Therefore, as a larger number of positional information items are extracted, the entire print image is more likely to be in focus, the distance becomes more appropriate, and it is easier to read the additional information. That is, the number of positional information items extracted is an index indicating closeness to an appropriate positional relationship. In this embodiment, the number of positional information items extracted is defined as "reading sensitivity". The "reading sensitivity" is information different from the information of the "progress of reading" indicating the progress of the reading of the additional information.

In this embodiment, the positional relationship between the smart phone and the readable position of the multiplexed printed matter 1401 is detected on the basis of the extraction result of the positional information. However, the invention is not limited thereto. The positional relationship between the smart phone 104 and the readable position may be detected on the basis of information other than the extraction result of the positional information. For example, the multiplexed printed matter 1401 may be detected from the captured image and the position where the smart phone 104 is close to the readable position of the multiplexed printed matter 1401 may be detected on the basis of the size or inclination of the image.

In Step S1504, the CPU 2000 determines whether or not one or more positional information items have been detected. In a case where no positional information has been detected, the CPU 2000 returns to Step S1502 and obtains a captured image again. In a case where one or more positional information items have been extracted, the CPU 2000 proceeds to Step S1505 and displays a reading state screen. For example, in Step S1505, a screen 1702 illustrated in FIG. 17 is displayed.

In this embodiment, whether the reading state screen is displayed or the captured image is obtained again is determined on the basis of whether or not one or more positional information items have been extracted. However, the number of positional information items extracted (threshold value) which is a criterion of determination may be two or more. However, in a case where the threshold value is large, the smart phone 104 needs to be moved closer to the readable position in order to display the reading state screen. Therefore, it is preferable to reduce the threshold value in order to perform the determination within a wider range.

As described above, in this embodiment, in order to read any one of the additional information items 502a to 502d, it is necessary to obtain (extract) four positional information items surrounding the additional information. That is, in some cases, it is difficult to appropriately read the additional information in a state in which only one positional information item has been extracted. In this case, the reading of the positional information does not actually start. However, at the time when any of the positional information items can be obtained, a predetermined screen (for example, a screen 1702 illustrated in FIG. 17) is displayed to inform the user that the positional relationship between the camera-equipped portable terminal (smart phone) 104 and the multiplexed printed matter 1401 is close to an appropriate state. Hereinafter, the position where the camera-equipped portable terminal 104 can appropriately read the additional information of the multiplexed printed matter 1401 is referred to as the readable position. In addition, the position where any of the positional information items can be obtained is referred to as a "reading preparation position" which is the position of a stage of preparation for reading.

Figure 17:
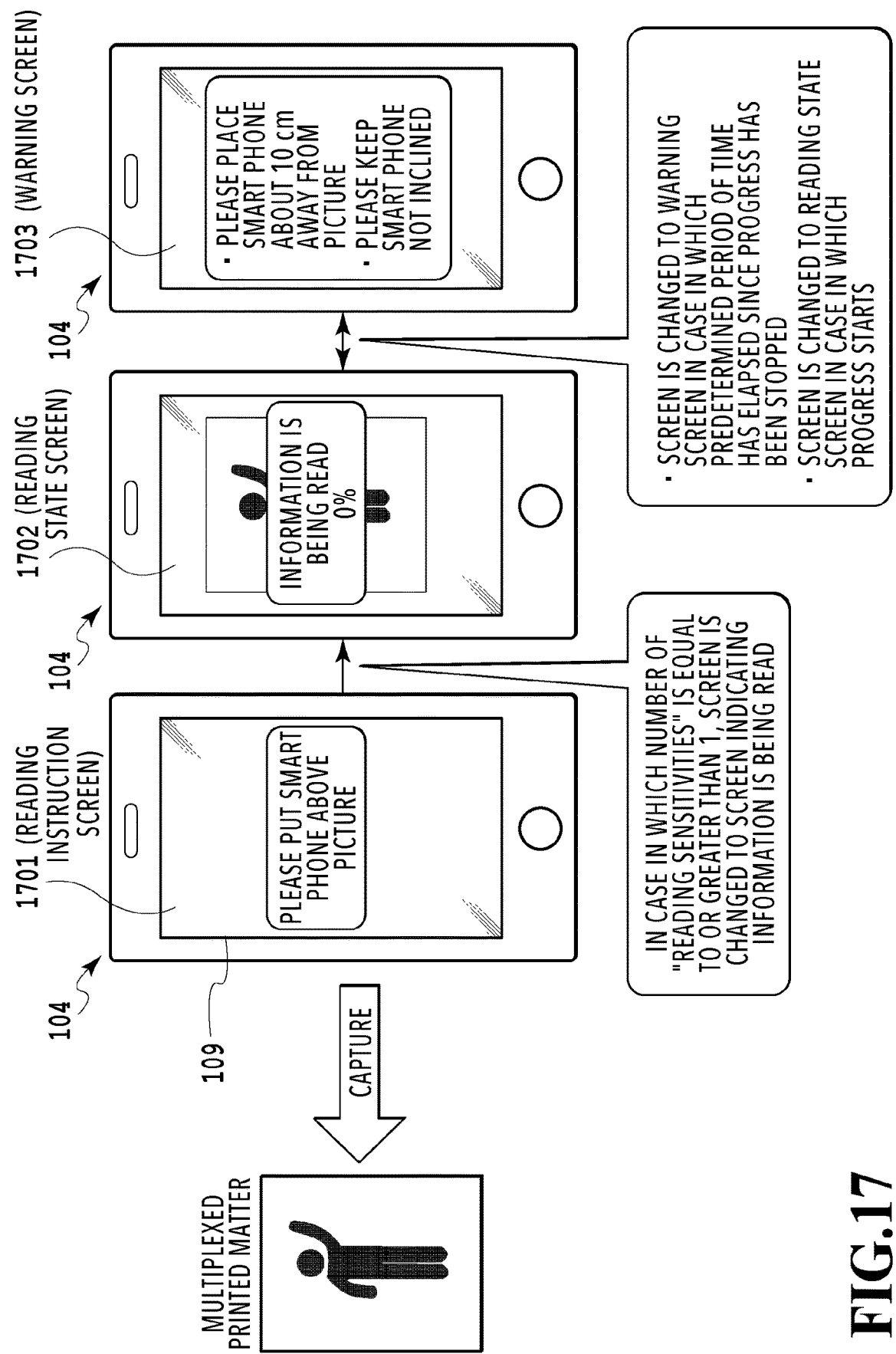
FIG. 17 is a diagram illustrating a reading instruction screen, a reading state screen, and a warning screen in a reading process.

FIG. 17 is a diagram illustrating a display screen of the smart phone 104 according to this embodiment. As illustrated in FIG. 17, a message indicating "being read" and the "progress of reading" are displayed on the reading state screen 1702. The progress of reading is displayed as, for example, the percentage of the amount of read additional information in the total amount of additional information embedded in the multiplexed printed matter 1401 or a progress bar.

In this embodiment, even in a situation in which only one to three positional information items among four positional information items surrounding the additional information are obtained and a reading operation does not actually start, the message "being read" is displayed. As such, since the message "being read" is displayed, in the reading preparation stage, the careless movement of the position of the smart phone 104 by the user is prevented. Therefore, it is possible to reduce confusion or unnecessary movement in search for the reading position.

A message indicating that the smart phone 104 is at a position (reading preparation position) close to the readable position of the multiplexed printed matter 1401 or a UI including an indicator indicating the "reading sensitivity" may be displayed on the reading state screen 1702.

As described above, in this embodiment, the reading state screen 1702 is displayed to inform the user whether the smart phone 104 is located at a position where the additional information of the multiplexed printed matter 1401 can be read or is located at a position close to the readable position. Therefore, the user is prevented from carelessly moving the smart phone 104 to a position close to the readable position and it is possible to effectively move the smart phone 104 to the readable position.

Figure 18:
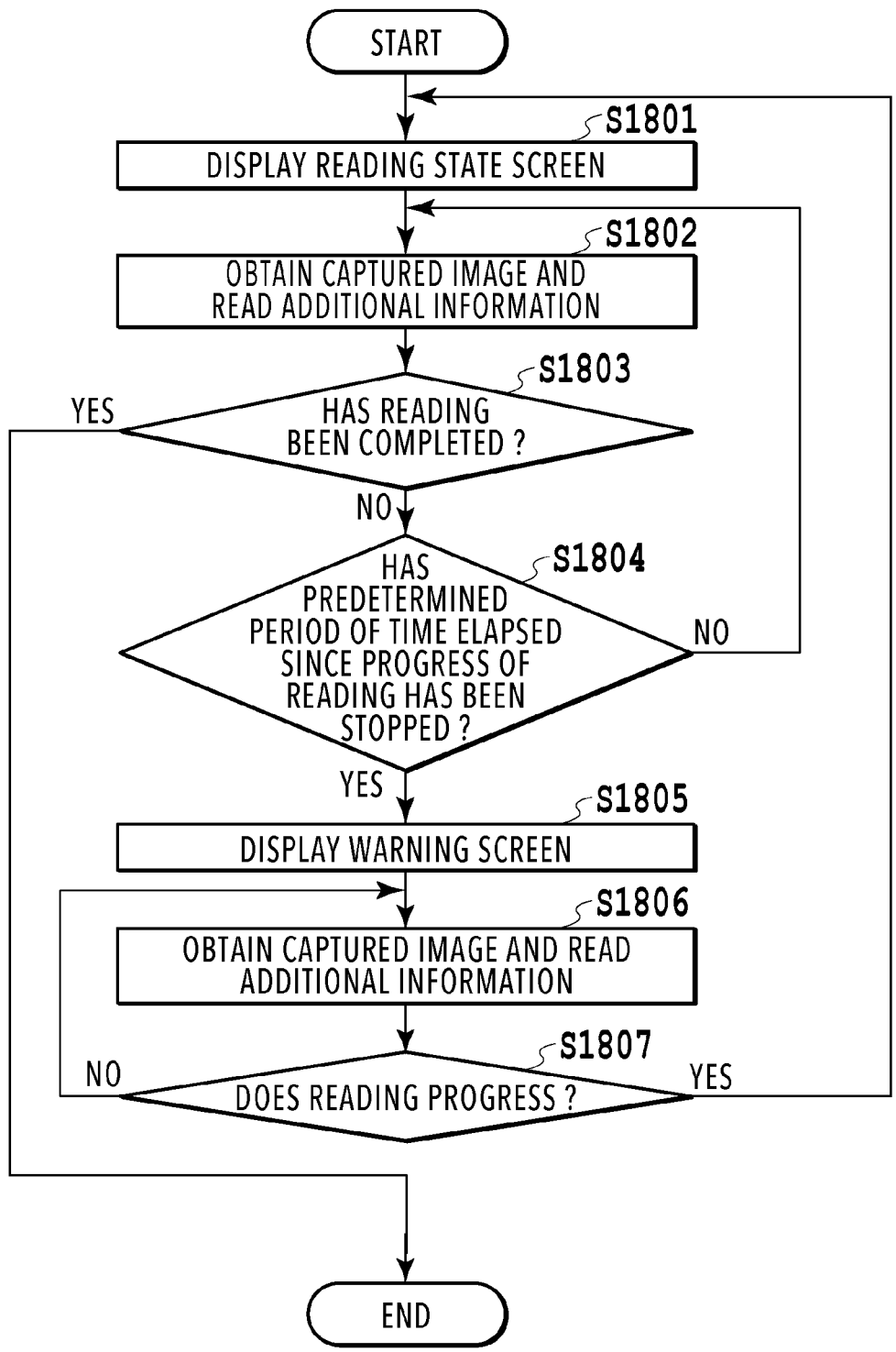
FIG. 18 is a diagram illustrating an example of a notification operation related to an additional information extraction process.

Next, a process after the reading state screen 1702 is displayed will be described with reference to a flowchart illustrated in FIG. 18. First, in Step S1801, the CPU 2000 displays the reading state screen 1702. In Step S1802, the CPU 2000 obtains a captured image and reads the additional information. In the reading of the additional information, as described above, the CPU 2000 determines an area in which the additional information (502a to 502b) has been embedded from the positional information (for example, 501 and 503) extracted from the captured image and reads the area.

In Step S1803, the CPU 2000 determines whether the reading of all data of the additional information has been completed. In a case where all data has been read, the CPU 2000 ends the reading process.

On the other hand, in a case where the reading has not been completed, in Step 51804, the CPU 2000 determines whether a predetermined period of time has elapsed since the progress of reading has stopped. In a case where the predetermined period of time has not elapsed since the progress of reading has stopped, the CPU 2000 returns to Step S1802 and performs the reading process again.

In a case where the predetermined period of time has elapsed since the progress of reading has stopped, the CPU 2000 displays a warning screen 1703 illustrated in FIG. 17 to instruct the user to adjust the distance from the multiplexed printed matter 1401 or the inclination. The warning screen 1703 may be displayed, for example, in a case where the reading sensitivity is 0 (all of the positional information is not extracted) or a case in which the progress of reading is delayed.

After the warning screen is displayed, in Step S1806, the CPU 2000 performs the obtainment of a captured image and the reading of the additional information again and determines whether the reading progresses (Step S1807). In a case where the positional relationship between the smart phone 104 and the multiplexed printed matter 1401 is not appropriate and the reading does not progress, the CPU 2000 returns to Step S1806 and performs reading again. During the process from Step S1806 to Step S1807, the display of the warning screen 1703 is maintained. In a case where the positional relationship between the smart phone 104 and the multiplexed printed matter 1401 is appropriate and the reading progresses, the CPU 2000 returns to Step S1801 and returns the display screen from the warning screen 1703 to the reading state screen 1702.

As such, the display screen returns to the reading state screen 1702 on condition that the "reading sensitivity" is not equal to or greater than 1 and the reading of the additional information progresses. In addition, in a case where the threshold value of the reading sensitivity increases (for example, the threshold value increases from 1 or more to 2 or more) and the reading sensitivity is greater than the threshold value, the display of the smart phone 104 may be changed. In this case, the position needs to be closer to the appropriate positional relationship in order to change the display screen to the reading state screen 1702. Therefore, it is possible to lead the smart phone 104 to a position where a more appropriate relationship is obtained between the smart phone 104 and the multiplexed printed matter 1401.

In this embodiment, the display screen of the camera-equipped portable terminal 104, such as a smart phone, is changed to the reading instruction screen 1701, the reading state screen 1702, and the warning screen 1703 to notify the user of information. However, the screen may not be changed and display content may be changed on one screen. For example, in a case where the progress is stopped during reading, both the progress bar and an instruction to adjust the distance or the inclination may be displayed on the same screen.

As described above, according to this embodiment, a reading state is notified on the basis of the positional relationship between the multiplexed printed matter and the camera-equipped portable terminal to inform the user that the positional relationship between the camera-equipped portable terminal 104 and the multiplexed printed matter 1401 is close to an appropriate state. Therefore, it is possible to move the camera-equipped portable terminal 104 to the readable position more effectively.

Other Embodiments

In the above-described embodiments, after the reading instruction screen is displayed, the reading state screen 1702 is displayed. In addition, in a case where the reading does not progress, the warning screen 1703 that prompts the user to change the imaging position of the imaging unit, such as the camera-equipped portable terminal 104, is displayed. However, in a case where the imaging unit is located at any imaging position with respect to the multiplexed printed matter according to the reading instruction screen, the warning screen 1703 may be instantly displayed on the basis of, for example, the extraction result of the positional information. In a case where all of the positional information is not extracted, for example, the following may be notified: there is a large deviation between the position of the imaging unit and the readable position; and an instruction to make a large parallel movement or to rotate the imaging unit.

In a case where the camera-equipped portable terminal 104 can measure the distance between the camera-equipped portable terminal 104 and the printed matter, an additional message may be displayed. For example, the camera-equipped portable terminal 104 may display a message "Please bring the portable terminal close to the printed matter" or "Please keep the portable terminal away from the printed matter" on the basis of a reference distance and the measured distance. In a case where it is determined in Step S1804 that the reading does not progress even though the measured distance is equal to the reference distance, the camera-equipped portable terminal 104 may display a message indicating that the camera-equipped portable terminal 104 is not inclined.

In the above description, the display unit configured to display the display screen or the sound output unit configured to output a sound is used as an example of the notification unit that notifies the user of information. However, the display unit and the sound output unit may be operated at the same time to notify the user of information.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-126767 filed Jun. 28, 2017, which is hereby incorporated by reference wherein in its entirety.

What is claimed is:

1. An image processing apparatus including an imaging unit comprising:
an extraction unit configured to perform an extraction process of extracting positional information from captured image information obtained by capturing a printed matter in which the positional information and additional information have been embedded by an electronic watermark, wherein the extraction unit starts an extraction process of extracting the additional information in a case where an extraction state of the positional information satisfies a first condition;
a first display unit configured to display a progress screen indicating progress of the extraction process of the additional information in a case where the state of extracting the positional information satisfies a second condition; and
a second display unit configured to display a warning message indicating a change of a positional relationship between the image processing apparatus and the printed matter in a case where the state of extracting the additional information from the captured image information satisfies a third condition after the progress screen is displayed;
wherein the first display unit displays the progress screen in a case where the state of extracting the additional information is changed from a state of satisfying the third condition to a state of not satisfying the third condition while the warning message is displayed, and
wherein the extracting unit, the first display unit and the second display unit are implemented by at least one processor in the image processing apparatus.

2. The image processing apparatus according to claim 1, wherein the second display unit displays the warning message in a case where the progress of extracting the additional information has stopped for a predetermined period of time.

3. The image processing apparatus according to claim 1, wherein the second display unit ends displaying the warning message in a case where the state of extracting the additional information is changed from the state of satisfying the third condition to the state of not satisfying the third condition while the warning message is displayed.

4. The image processing apparatus according to claim 1, wherein a positional relationship between the image forming apparatus and the additional information is defined based on the positional information, and
a positional relationship between the imaging unit and the additional information is determined on the basis of the positional information extracted by the imaging unit.

5. The image processing apparatus according to claim 4, wherein the first condition is a number of positional information items extracted by the extraction unit.

6. An image processing method performed in an image processing apparatus including an imaging unit comprising:
performing an extraction process of extracting positional information from captured image information obtained by capturing a printed matter in which the positional information and additional information have been embedded by an electronic watermark;
starting an extraction process of extracting the additional information in a case where an extraction state of the positional information satisfies a first condition;
displaying a progress screen indicating progress of the extraction process of the additional information in a case where the state of extracting the positional information satisfies a second condition; and displaying a warning message indicating a change of a positional relationship between the image processing apparatus and the printed matter in a case where the state of extracting the additional information from the captured image information satisfies a third condition after the progress screen is displayed, wherein the progress screen is displayed in a case where the state of extracting the additional information is changed from a state of satisfying the third condition to a state of not satisfying the third condition while the warning message is displayed; and wherein extracting the positional information and the additional information, displaying the progress screen, and displaying the warning message are implemented by at least one processor in the image processing apparatus.

7. The image processing method according to claim 6, wherein the warning message is displayed in a case where the progress of extracting the additional information has stopped for a predetermined period of time.

8. The image processing method according to claim 6, wherein the displaying the warning message is ended in a case where the state of extracting the additional information is changed from the state of satisfying the third condition to the state of not satisfying the third condition while the warning message is displayed.

9. The image processing method according to claim 6, wherein a positional relationship between the image forming apparatus and the additional information is defined based on the positional information, and a positional relationship between the imaging unit and the additional information is determined on the basis of the positional information extracted by the imaging unit.

10. The image processing method according to claim 6, wherein the conditions for starting the extraction process are determined by a number of positional information items extracted by an extraction unit.

11. A non-transitory computer readable storage medium storing a program for causing a computer to perform an image processing method, the method comprising:

performing an extraction process of extracting positional information from captured image information obtained by capturing a printed matter in which the positional information and additional information have been embedded by an electronic watermark;

starting an extraction process of extracting the additional information in a case where an extraction state of the positional information satisfies a first condition;

displaying a progress screen indicating progress of the extraction process of the additional information in a case where the state of extracting the positional information satisfies a second condition; and displaying a warning message indicating a change of a positional relationship between an image processing apparatus and the printed matter in a case where the state of extracting the additional information from the captured image information satisfies a third condition after the progress screen is displayed, wherein the progress screen is displayed in a case where the state of extracting the additional information is changed from a state of satisfying the third condition to a state of not satisfying the third condition while the warning message is displayed, and wherein extracting the positional information and the additional information, displaying the progress screen, and displaying the warning message are implemented by at least one processor in the image processing apparatus.

* * * * *